(12) United States Patent
Watanabe

(10) Patent No.: US 10,108,009 B2
(45) Date of Patent: Oct. 23, 2018

(54) IMAGE DISPLAY DEVICE

(71) Applicant: OLYMPUS CORPORATION, Hachioji-shi, Tokyo (JP)

(72) Inventor: Satoshi Watanabe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 253 days.

(21) Appl. No.: 15/257,155

(22) Filed: Sep. 6, 2016

(65) Prior Publication Data

US 2016/0370582 A1 Dec. 22, 2016

Related U.S. Application Data

(63) Continuation of application No. PCT/JP2015/001201, filed on Mar. 5, 2015.

(30) Foreign Application Priority Data

Mar. 20, 2014 (JP) ................ 2014-059021

(51) Int. Cl.
  *G02B 27/00* (2006.01)
  *G02B 5/18* (2006.01)
  (Continued)

(52) U.S. Cl.
  CPC ....... *G02B 27/0081* (2013.01); *G02B 5/1861* (2013.01); *G02B 6/0031* (2013.01);
  (Continued)

(58) Field of Classification Search
  CPC ............ G02B 27/0081; G02B 27/0101; G02B 27/017; G02B 27/0172; G02B 27/0176;
  (Continued)

(56) References Cited

U.S. PATENT DOCUMENTS

2006/0221448 A1  10/2006  Nivon et al.
2006/0228073 A1  10/2006  Mukawa et al.
(Continued)

FOREIGN PATENT DOCUMENTS

JP    2008535032 A    8/2008
JP    2010282231 A    12/2010
(Continued)

OTHER PUBLICATIONS

International Search Report (ISR) dated May 19, 2015 and Written Opinion issued in International Application No. PCT/JP2015/001201.

*Primary Examiner* — Stephone B Allen
*Assistant Examiner* — Adam W Booher
(74) *Attorney, Agent, or Firm* — Holtz, Holtz & Volek PC

(57) ABSTRACT

Provided is an image display device, including: an image projection optical system projecting, at infinity, image light corresponding to an arbitrary image; a first light guide portion formed like a plate having a first plane and a second plane, in which the image light projected from the image projection optical system is transmitted in part through the first plane with the rest being reflected between the first plane and the second plane, so as to be propagated in the x-direction by repeating the transmission and the reflection; a first spacer plate formed like a plate having a third plane and a fourth plane, the third plane being bonded to the first plane; and a first output deflector formed on or bonded to the fourth plane, the first output deflector diffracting part of the image light transmitted through the first plane, in a direction substantially perpendicular to the first plane.

22 Claims, 14 Drawing Sheets

(51) Int. Cl.
*G02B 6/00* (2006.01)
*G02B 27/01* (2006.01)
*F21V 8/00* (2006.01)

(52) U.S. Cl.
CPC ......... *G02B 6/0055* (2013.01); *G02B 6/0056* (2013.01); *G02B 27/0172* (2013.01); *G02B 2027/0125* (2013.01); *G02B 2027/0174* (2013.01); *G02B 2027/0196* (2013.01)

(58) Field of Classification Search
CPC ...... G02B 5/18; G02B 5/1814; G02B 5/1861; G02B 5/1866; G02B 5/1871; G02B 6/0011; G02B 6/0013; G02B 6/0023; G02B 6/0031; G02B 6/0033; G02B 6/0035–6/004; G02B 6/0043; G02B 6/005; G02B 6/0055; G02B 6/0056; G02B 6/0075; G02B 6/008; G02B 2027/011; G02B 2027/0123; G02B 2027/0125; G02B 2027/0174; G02B 2027/0178; G02B 2027/0196; G02B 2005/1804

See application file for complete search history.

(56) References Cited

U.S. PATENT DOCUMENTS

| | | | |
|---|---|---|---|
| 2007/0070859 A1* | 3/2007 | Hirayama | G02B 5/32 369/112.04 |
| 2008/0239424 A1 | 10/2008 | Mukawa et al. | |
| 2010/0220295 A1 | 9/2010 | Mukawa et al. | |
| 2011/0211239 A1 | 9/2011 | Mukawa et al. | |
| 2012/0081789 A1 | 4/2012 | Mukawa et al. | |
| 2012/0127577 A1 | 5/2012 | Desserouer | |
| 2012/0206811 A1 | 8/2012 | Mukawa et al. | |
| 2013/0155513 A1 | 6/2013 | Mukawa et al. | |
| 2014/0192418 A1 | 7/2014 | Suzuki | |
| 2015/0355467 A1 | 12/2015 | Mukawa et al. | |
| 2016/0170215 A1 | 6/2016 | Mukawa et al. | |

FOREIGN PATENT DOCUMENTS

| | | |
|---|---|---|
| JP | 2013061480 A | 4/2013 |
| WO | 2006025317 A1 | 3/2006 |

* cited by examiner

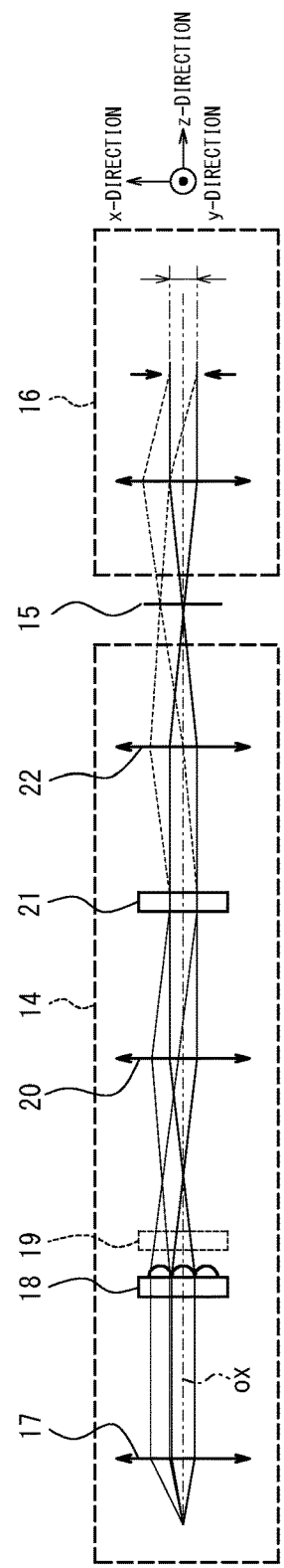
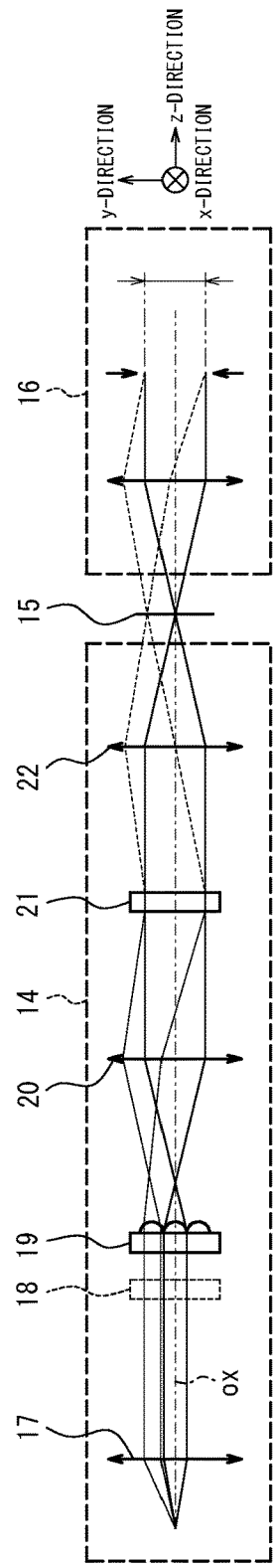
FIG. 2A
FIG. 2B

US 10,108,009 B2

IMAGE DISPLAY DEVICE

CROSS REFERENCE TO RELATED APPLICATIONS

The present application is a Continuing Application based on International Application PCT/JP2015/001201 filed on Mar. 5, 2015, which in turn claims the priority from Japanese Patent Application No. 2014-59021 filed on Mar. 20, 2014, the entire disclosure of which is herein incorporated by reference.

TECHNICAL FIELD

This disclosure relates to an image display device which expands an exit pupil to project an image.

BACKGROUND

Various image display devices have been known as a device for projecting a two-dimensional image into a field of view of an observer, which propagates image light while repeatedly reflecting the light within a light guide plate, so as to emit the image light which is deflected in part toward the observer's side on one surface side of the light guide plate, to thereby expand an exit pupil. As a method of deflecting image light in the light guide plate, it has been known to use diffraction effects (see, for example, JP2013061480A (PTL 1)).

CITATION LIST

Patent Literature

PTL 1: JP2013061480A

SUMMARY

According to the method of propagating image light in a light guide plate through reflection and sequentially diffracting, by means of a diffraction grating, the propagating image light so as to extract part of the image light, a functional film fir controlling the light-extraction efficiency, such as a polarization beam splitting film, is attached on the diffraction grating side of light guide plate, and a thin adhesive layer is disposed between the functional-film-attached surface of the light guide plate and the diffraction grating so as to connect the both. However, as a result of intensive studies, we have found that components of image light propagating inside the adhesive layer cause image deterioration such as image blur and uneven brightness in an image to be displayed. In below, description is given of how such image deterioration is caused.

FIG. 13 is a side view schematically illustrating a configuration example of a pupil expanding optical system 110 of an image display device including a diffraction grating. The pupil expanding optical system 110 is configured by including: a light guide plate 111; a functional film 112; an incident deflector 113; and a diffraction plate 114. The light guide plate 111 has a first plane S101 and a second plane S102 opposing to each other, allowing image light to be repeatedly reflected between the first plane S101 and the second plane S102 so as to propagate therethrough. The incident deflector 113 is bonded to one end on the image light incident side of the light guide plate 111, so that image light incident from one end of the second plane S102 of the light guide plate 111 transmits through the first plane S101 to be reflected by the slope S103 of the incident deflector 113, so as to be obliquely incident on the light guide plate 111 from the first plane S101 to be re-incident thereon. Further, the first plane S101 of the light guide plate 111 has the functional film 112 evaporated thereon in a position not bonded with the incident deflector 113. The functional film 112 controls reflection and transmittance of image light. The diffraction plate 114 is adhered to the light guide plate 111 via a transparent adhesive 115, and a diffraction plane S104 is formed on the adhesive surface. The diffraction plate 114 has diffraction grooves extending in the direction perpendicular to the traveling direction (the left-hand side of FIG. 13) of image light in the light guide plate 111.

Image light propagating inside the light guide plate 111 at a traveling angle satisfies total reflection conditions relative to the second plane S102. On the other hand, part of image light incident on the first plane S101 transmits through the functional film 112 to be diffracted by the diffraction plane of the diffraction plate 114 in a direction substantially perpendicular to the first plane S101. The diffracted light is re-incident on the light guide plate 111 from the first plane S101 and emitted from the second plane S102 toward an eyeball of the observer. The image light is incident on the pupil expanding optical system 110 as a light flux having a width, so as to be emitted from positions on the second plane S102 of the light guide plate 111. As a result, the second plane S102 forms an expanded exit pupil.

However, the pupil expanding optical system 110 using the aforementioned diffraction plate 114 causes following problems. FIG. 14 is an enlarged view of the portion enclosed by the two-dot chain line in FIG. 13. Here, the adhesive layer 115 generally has only about 10 μm thickness, which is much thinner the light guide plate 111 which has a thickness of several millimeters (mm). However, FIG. 14 shows an enlarged view thereof for the sake of explanation. Referring to FIG. 14, image light b11 propagating the light guide plate 111 transmits through the functional film 112 to be incident on the diffraction plane S104 of the diffraction plate 114, so as to generate zero order diffraction light 1112 in addition to first order diffraction light. The functional film 112 is designed to reflect most part of the image light, and thus the zero order diffraction light b12 is subjected to multiple reflection inside the adhesive layer 115 while being transformed in part into first order diffraction light b13 every time the zero order diffraction light b12 is incident on the diffraction plane S104 so as to pass through the light guide plate 111 to be emitted from the second plane S102. As a result, a plurality of mutually parallel first order diffraction lights b13 are generated, which interfere with one another on the retina of the observer, generating brightness and image unevenness. Here, of the plurality of arrows representing the first order diffraction lights b13 of FIG. 14, the rightmost light beam serves as image light that contributes to normal image formation, with the lights designated by the rest of the arrows being unnecessary.

The disclosed image display apparatus includes:
    an image projection optical system projecting, at infinity, image light corresponding to an arbitrary image;
    a first light guide portion formed like a plate having a first plane and a second plane parallel and opposing to each other, in which the image light projected from the image projection optical system is transmitted in part through the first plane with the rest being reflected between the first plane and the second plane, so as to be propagated in the x-direction perpendicular to the optical axis direction of the image projection optical system by repeating the transmission and the reflection;

a first spacer plate formed like a plate having a third plane and a fourth plane parallel and opposing to each other, the third plane being bonded to the first plane; and a first output deflector formed on or bonded to the fourth plane, the first output deflector diffracting part of the image light transmitted through the first plane, in a direction substantially perpendicular to the first plane, the first output deflector comprising a reflective diffraction plane, and satisfying the following expression:

$$n_{w1} \frac{\cos\theta_{c1}}{\tan\theta_{c1}} \left(1 - \frac{2t_1 n_{s1}}{\lambda\cos\theta_{c1} + 2t_1 n_{s1}}\right) \leq 0.0006 \qquad \text{[Expression 1]}$$

where $\theta_{c1}$ is a propagation angle of the image light in the first spacer plate in which the first output deflector diffracts the image light perpendicularly to the fourth plane, $t_1$ is the thickness of the first spacer plate, $\lambda$, is the wavelength of the image light, $n_{s1}$ is the refractive index of the first spacer plate, and $n_{w1}$ is the refractive index of the first light guide portion.

Alternatively, the first output deflector may include a transmissive diffraction plane, and preferably satisfy the following expression:

$$n_{s1} \frac{\cos\theta_{c1}}{\tan\theta_{c1}} \left(1 - \frac{2t_1 n_{s1}}{\lambda\cos\theta_{c1} + 2t_1 n_{s1}}\right) \leq 0.0006 \qquad \text{[Expression 2]}$$

where $\theta_{c1}$ is a propagation angle of the image light in the first spacer plate in which the first output deflector diffracts the image light perpendicularly to the fourth plane, $t_1$ is the thickness of the first spacer plate, $\lambda$, is the wavelength of the image light, and $n_{s1}$ is the refractive index of the first spacer plate.

The disclosed image display device may preferably satisfy the following expression:

$$n_{w1} \frac{\cos\theta_{c1}}{\tan\theta_{c1}} \left(1 - \frac{2T_{v1}}{\lambda\cos\theta_{c1} + 2T_{v1}}\right) < 0.0006 \qquad \text{[Expression 3]}$$

where $T_1$ represents the thickness of the first light guide portion, which provides $T_{v1}=\text{abs}(n(n_{s1}t_1)-m(n_{w1}T_1))$ as to a combination of arbitrary natural numbers n and in smaller than 5.

Further preferably, the aforementioned image display device may include:

a second light guide portion formed like a plate having a fifth plane and a sixth plane parallel and opposing to each other, the second light guide portion propagating the part of the image light diffracted by the first output deflector and emitted from the second plane, the image light being transmitted in part through the fifth plane while the rest of the image light being repeatedly reflected between the fifth plane and the sixth plane, so as to be propagated in the y-direction which is perpendicular to the optical axis direction of the image projection optical system and also perpendicular to the x-direction;

a second spacer plate formed like a plate having a seventh plane and an eighth plane parallel and opposing to each other, the seventh plane being bonded to the fifth plane; and a second output deflector formed on or bonded to the eighth plane, the second output deflector diffracting part of the image light transmitted through the fifth plane, in a direction substantially perpendicular to the fifth plane.

Preferably, the second output deflector may include a reflective diffraction plane, and satisfy the following expression:

$$n_{w2} \frac{\cos\theta_{c2}}{\tan\theta_{c2}} \left(1 - \frac{2t_2 n_{s2}}{\lambda\cos\theta_{c2} + 2t_2 n_{s2}}\right) \leq 0.0006 \qquad \text{[Expression 4]}$$

where $\theta_{c2}$ is a propagation angle of the image light in the second spacer plate in which the second output deflector diffracts the image light perpendicularly to the eighth plane, $t_2$ is the thickness of the second spacer plate, $\lambda$ is the wavelength of the image light, $n_{s2}$ is the refractive index of the second spacer plate, and $n_{w2}$ is the refractive index of the second light guide portion.

Alternatively, the second output deflector may include a transmissive diffraction plane, and satisfy the following expression: and satisfies the following expression:

$$n_{s2} \frac{\cos\theta_{c2}}{\tan\theta_{c2}} \left(1 - \frac{2t_2 n_{s2}}{\lambda\cos\theta_{c2} + 2t_2 n_{s2}}\right) \leq 0.0006 \qquad \text{[Expression 5]}$$

where $\theta_{c2}$ is a propagation angle of the image light in the second spacer plate in which the second output deflector diffracts the image light perpendicularly to the eighth plane, $t_2$ is the thickness of the second spacer plate, $\lambda$ is the wavelength of the image light, and $n_{s2}$ is the refractive index of the second spacer plate.

Further, the following expression may preferably be satisfied:

$$n_{w2} \frac{\cos\theta_{c2}}{\tan\theta_{c2}} \left(1 - \frac{2T_{v2}}{\lambda\cos\theta_{c2} + 2T_{v2}}\right) < 0.0006 \qquad \text{[Expression 6]}$$

where $T_2$ represents the thickness of the second light guide portion, which provides $T_{v2}=\text{abs}(n(n_{s2}t_2)-m(n_{w2}T_2))$ as to a combination of arbitrary natural numbers n and in smaller than 5.

BRIEF DESCRIPTION OF THE DRAWINGS

In the accompanying drawings:

FIGS. 2A and 2B each are a configuration diagram schematically illustrating a configuration of the image projection optical system of FIG. 1;

DETAILED DESCRIPTION

The following describes embodiments of the disclosed device, with reference to the drawings.

(Embodiment 1)

Figure 1:
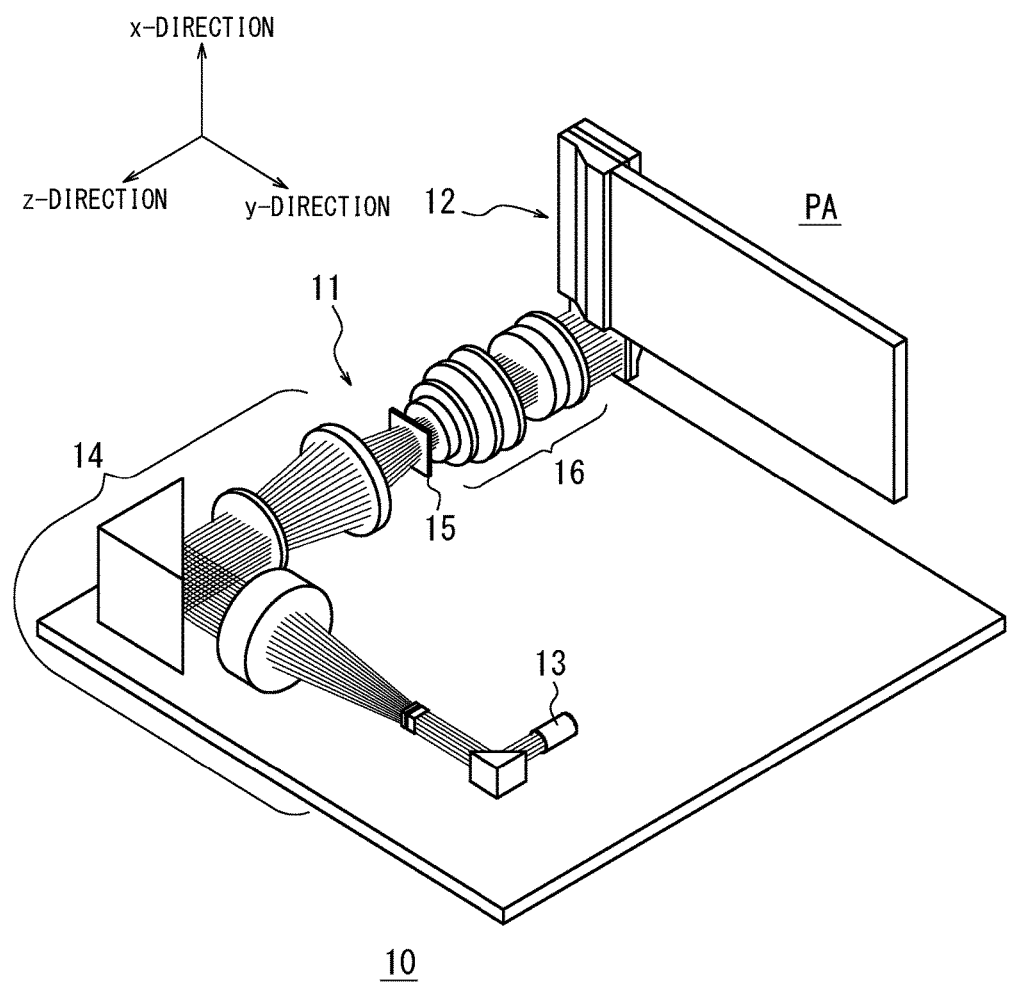
FIG. 1 is a perspective view of the disclosed image display device according to Embodiment 1.

FIG. 1 is a perspective view of the disclosed image display device according to Embodiment 1.

As illustrated in FIG. 1, the image display device 10 is configured by including an image projection optical system 11 and a pupil expanding optical system 12. In Embodiment 1, the direction along the optical axis of the image projection optical system 11 is defined as z-direction and two directions perpendicular to each other and also perpendicular to the z-direction are each defined as x-direction (first direction) and y-direction (second direction), respectively. In FIG. 1, the x-direction is oriented upward. Further, in FIG. 1, the y-direction is in the lower right diagonal direction and the z-direction is in the lower left diagonal direction, in the vicinity of the pupil expanding optical system 12.

The image projection optical system 11 projects, at infinity, image light corresponding to an arbitrary image. The pupil expanding optical system 12 receives image light projected by the image projection optical system 11 and emits the light by expanding the exit pupil. The observer may focus on anywhere in the projection region PA of the expanded exit pupil, to thereby observe the image.

Next, a configuration of the image projection optical system 11 is described. The image projection optical system 11 is configured by including a light source 13, an illumination optical system 14, a transmission chart 15, and a projection optical system 16.

The light source 13 is driven by a light source driver (not shown), and uses power supplied from a battery (not shown) to emit laser as illumination light. The laser may have a wavelength of, for example, 532 nm.

As illustrated in FIGS. 2A and 2B, the illumination optical system 14 is configured by including: a collimator lens 17; a first lenticular lens 18; a second lenticular lens 19; a first lens 20; a diffuser 21; and a second lens 22. The collimator lens 17, the first lenticular lens 18, the second lenticular lens 19, the first lens 20, the diffuser 21, and the second lens 22 are optically coupled to one another.

The collimator lens 17 converts illumination light emitted from the light source 13 into parallel lights.

The first lenticular lens 18 has a plurality of lens elements disposed at a pitch of, for example, 0.1 mm to 0.5 mm, which is shorter than the width of the light flux of the illumination light emitted from the collimator lens 17, and is configured to have the incident parallel light flux irradiated across the plurality of lens elements. The first lenticular lens 18 has a refractive power in the x-direction, so as to diverge the illumination light converted into parallel light flux, along the x-direction.

The second lenticular lens 19 is shorter in focal length than the first lenticular lens 18. For example, the first lenticular lens 18 and the second lenticular lens 19 each have a focal length of 1.6 mm and 0.8 mm, respectively. The second lenticular lens 19 is disposed so that the back focal positions of the first lenticular lens 18 and the second lenticular lens 19 substantially coincide with each other. Further, the second lenticular lens 19 has a plurality of lens elements disposed at a pitch of, for example, 0.1 mm to 0.5 mm, which is shorter than the width of the light flux of the illumination light emitted from the collimator lens 17, and is configured to have the incident parallel light flux irradiated across the plurality of lens elements. The second lenticular lens 19 has a refractive power in the y-direction, so as to diverge the illumination light diverged in the x-direction, along the y-direction. Used as the second lenticular lens 19 is a lenticular lens with a divergence angle in the y-direction larger than the divergence angle in the x-direction of the first lenticular lens 18.

The first lens 20 is disposed so that the front focal position of the first lens 20 substantially coincides with the back focal positions of the first lenticular lens 18 and the second lenticular lens 19. The first lens 20 has a focal length of, for example, 50 mm. Accordingly, the first lens 20 converts the illumination light components emitted from the plurality of lens elements of the second lenticular lens 19 into parallel light fluxes different from one another in emission angle, and emits the light fluxes thus converted.

The diffuser 21 is disposed at a position which substantially coincides with the back focal position of the first lens 20. Accordingly, the plurality of light fluxes emitted from the first lens 20 are irradiated as being convoluted onto the diffuser 21. As a result, illumination light to be irradiated onto the diffuser 21 is in a rectangular shape having a light flux width longer in the y-direction than in the x-direction and has an intensity distribution where lasers having Gaussian intensity distributions are substantially uniformed. The diffuser 21 is driven by a diffuser-drive mechanism (not shown) to be vibrated along a plane perpendicular to the optical axis OX, so as to reduce the visibility of speckles. The diffuser 21 may be, for example, a holographic diffuser designed to have a rectangular divergence angle, which irradiates illumination light emitted from the diffuser 21 across the entire region of the rectangular transmission chart 15 to be described later, with a uniform intensity and in proper proportions.

The second lens 22 is disposed such that the front focal position of the second lens 22 coincides with the position of the diffuser 21. The second lens 22 have a focal length of, for example, 26 mm. Illumination lights incident at various angles are converged by the second lens 22 for each angle.

The transmission chart 15 is disposed at the back focal position of the second lens 22. The transmission chart 15 is in a rectangular shape having a length of, for example, 5.6 mm in the x-direction and 4.5 mm in the y-direction. The transmission chart 15 is driven by a chart driver (not shown) and forms an arbitrary image to be displayed by the image display device 10. Pixels forming the image of the transmission chart 15 are each irradiated with respective parallel light fluxes converged for each angle. Thus, light that has transmitted through each pixel forms image light.

The projection optical system 16 is disposed so that the exit pupil of the projection optical system 16 becomes optically conjugate with the diffuser 21. Accordingly, the exit pupil is in a rectangular shape longer in the y-direction than in the x-direction. The projection optical system 16 has a focal length of, for example, 28 mm, and projects, at a point of infinity, image light projecting the transmission chart 15. Here, the projection optical system 16 emits a group of parallel light fluxes having angular components in the x-direction and the y-direction corresponding to positions in the x-direction and in the y-direction of the pixels of the transmission chart 15, i.e., the object height from the optical axis OX. In Embodiment 1, the light fluxes are emitted within a range of for example, ±4.6° in the x-direction and ±5.7° in the y-direction. Image light projected by the projection optical system 16 is incident on the pupil expanding optical system 12.

Figure 3:
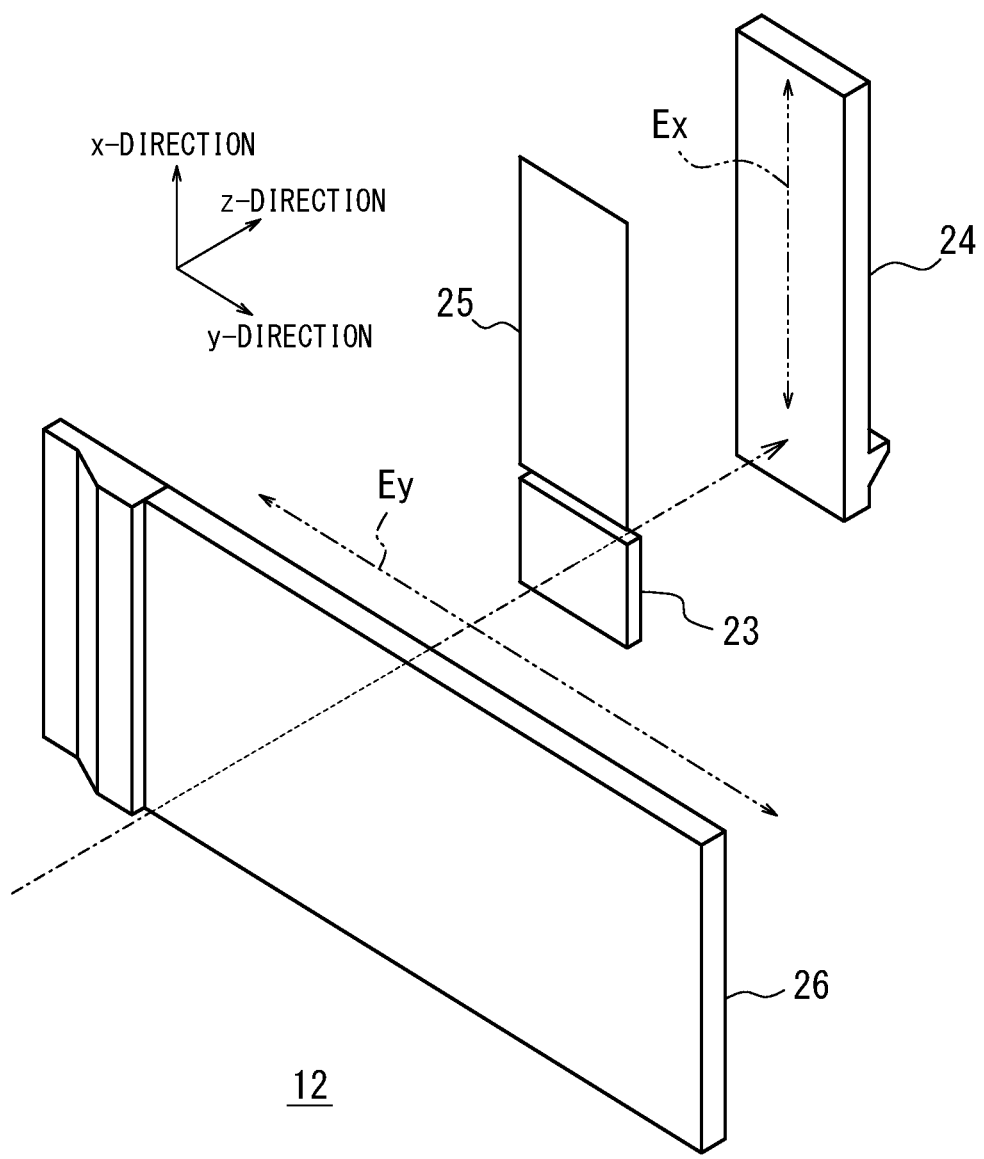
FIG. 3 is a perspective view showing the respective components spaced apart from one another of the pupil expanding optical system.

Next, a configuration of the pupil expanding optical system 12 is described with reference to FIG. 3. The pupil expanding optical system 12 is configured by including: a deflector 23; a first propagation optical system 24; a half-wave plate 25; and a second propagation optical system 26. The deflector 23, the first propagation optical system 24, the half-wave plate 25, and the second propagation optical system 26 of FIG. 3 are illustrated as largely spaced apart from one another for the sake of explanation, which are actually disposed close to each other as illustrated in FIG. 1.

The deflector 23 is disposed between the exit pupil of the projection optical system 16 and the projection optical system 16, and receives image light emitted from the projection optical system 16 to emit S-polarized light. The first propagation optical system 24 is disposed such that an incident region (not shown in FIG. 3) of a second plane (not shown in FIG. 3) of a first light guide portion (not shown in FIG. 3) to be described layer coincides with the exit pupil of the projection optical system 16, so as to expand, in the x-direction, an exit pupil projected by the deflector 23 as S-polarized light, and emits the exit pupil thus expanded (see the reference symbol "Ex"). The half-wave plate 25 rotates, by 90°, the polarization plane of image light expanded in the x-direction. With the polarization plane being rotated by 90°, image light can be incident as S-polarized light onto a first polarization beam splitting film (not shown in FIG. 3) of the second propagation optical system 26. The second propagation optical system 26 expands in the y-direction image light having a polarization plane rotated by the half-wave plate 25, and emits the image light thus expanded (see the reference symbol "Ey").

Figure 4:
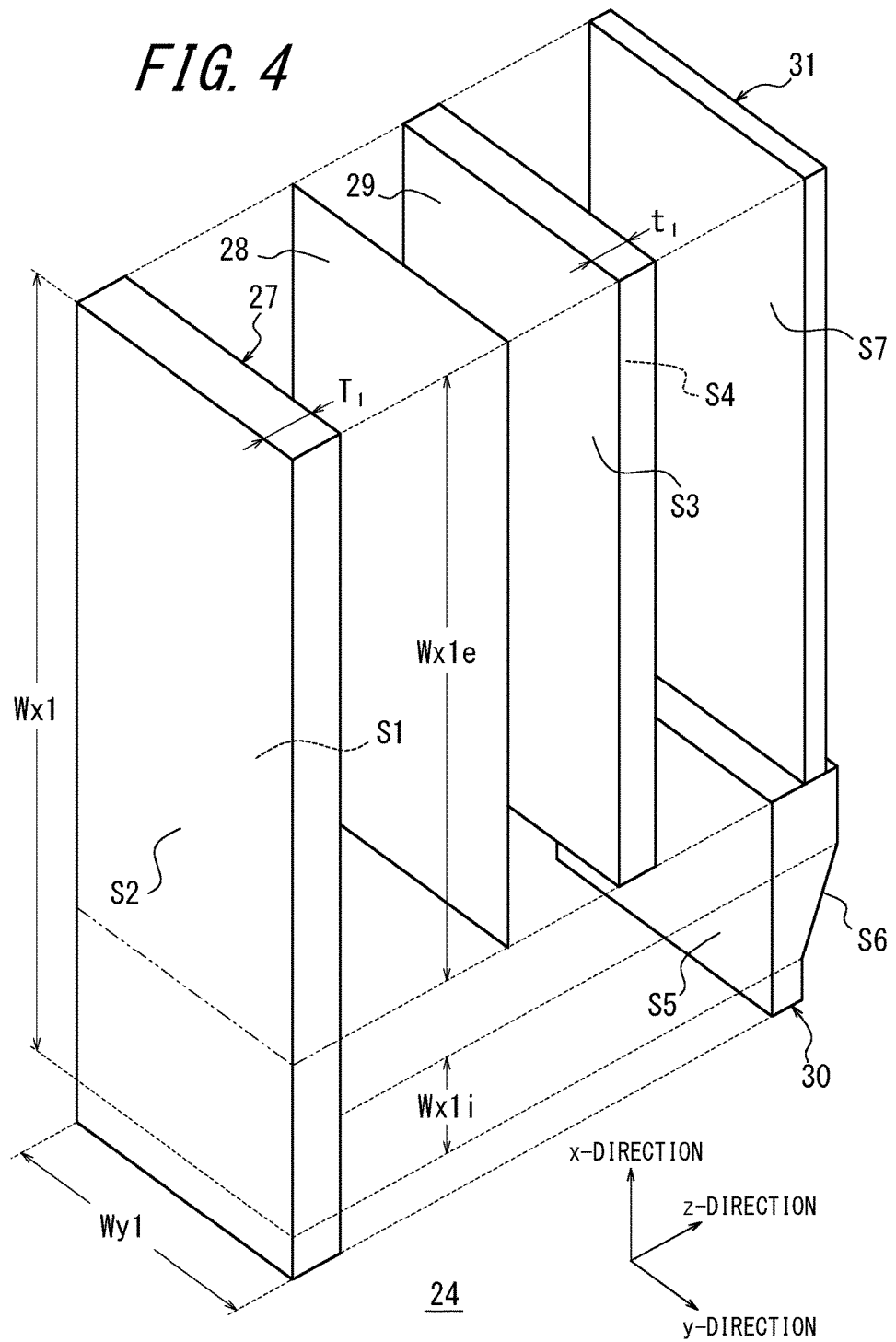
FIG. 4 is a perspective view showing the respective components spaced apart from one another of the first propagation optical system of FIG. 3.

Next, description is given of the function of the first propagation optical system 24 for expanding an exit pupil, along with the configuration of the first propagation optical system 24. As illustrated in FIG. 4, the first propagation optical system 24 is configured by including: a first light guide portion 27; a first polarization beam splitting film 28; a first spacer plate 29; a first input deflector 30; and a first output deflector 31. Here, the first polarization beam splitting film 28 is evaporated onto the first light guide portion 27 as will be described later, which are thus inseparable from each other. However, FIG. 4 schematically illustrates both separated from each other.

The first light guide portion 27 is a transparent flat plate having a first plane S1 and a second plane S2 opposing and parallel to each other. The first spacer plate 29 is formed like a plate having a third plane S3 and a fourth plane S4 opposing and parallel to each other, with the flat plane S3 being bonded to the first plane S1 of the first light guide portion 27 across the first polarization beam splitting film 28. The first input deflector 30 is a prism, which has an input-side bonding plane S5 in a plane shape and a slope S6 inclined relative to the input-side bonding plane S5. The first output deflector 31 is a plate-like reflective diffraction grating having a diffraction plane S7 on the first spacer plate 29 side.

The first polarization beam splitting film 28 is formed through evaporation on a part of the region of the first plane S1 of the first light guide portion 27, the first polarization beam splitting film 28 being in substantially the same size as the third plane S3 and the fourth plane S4 of the first spacer plate 29 and as the diffraction plane S7 of the first output deflector 31. The part of the region of the first plane S1 having the first polarization beam splitting film 28 formed thereon is bonded to the third plane S3 of the first spacer plate 29 through a transparent adhesive. Further, the diffraction plane S7 of the first output deflector 31 is bonded to the fourth plane S4 of the first spacer plate 29. The first input deflector 30 is bonded across the input-side bonding plane S5 through a transparent adhesive, to the first plane S1 in a region outside where the first polarization beam splitting film 28 is formed. The first light guide portion 27 is bonded to the first spacer plate 29 and the first input deflector 30, and the first spacer plate 29 is bonded to the first output deflector 31, so as to integrally form the first propagation optical system 24. Here, in the length direction ("x-direction" of FIG. 4) of the first propagation optical system 24, a region provided with the first input deflector 30 is hereinafter referred to as incident region and a region provided with the first output deflector 31 is hereinafter referred to as emission region (see FIG. 5). The first polarization beam splitting film 28 may preferably be formed so as to slightly protrude on the incident region side.

The integrally-formed first propagation optical system 24 is like a flat plate, and has lengths Wx1, Wy1 in the length direction ("x-direction" of FIG. 4) and in the width direction ("y-direction" of FIG. 4) of the first propagation optical system 24 and the first light guide portion 27, which are, for example, 60 mm and 20 mm, respectively. Further, the first polarization beam splitting film 28 has a length Wx1$e$ of, for example, 50 mm in the longitudinal direction. Further, the first input deflector 30 has a length Wx1$i$ of, for example, 7 mm in the longitudinal direction. As illustrated in FIG. 4, the first input deflector 30 may potentially include, as a surface opposing to the input-side bonding plane S5, areas having other surfaces than the slope S6, but the length Wx1$i$ of the first input deflector 30 in the longitudinal direction is along the longitudinal direction of the slope S6.

The first polarization beam splitting film 28 is a multilayer film designed to transmit light incident from a substantially perpendicular direction and to reflect most of obliquely incident light. A thin film having low-pass or band-pass spectral reflectance characteristics may potentially have such characteristics.

Figure 6:
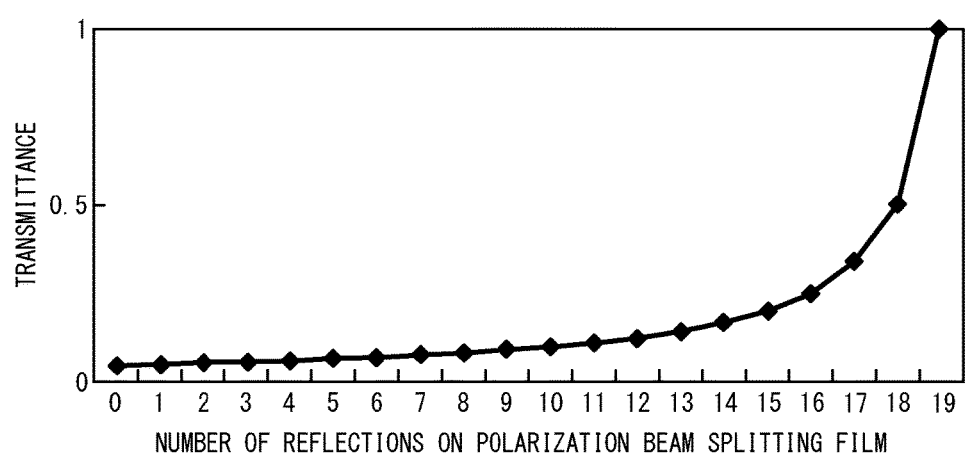
FIG. 6 is a graph showing the transmittance of the first polarizing beam splitting film, according to the distance from the incident region.

The first polarization beam splitting film 28 have a transmittance relative to oblique incident light, which varies depending on the position along the x-direction. For example, the first polarization beam splitting film 28 is formed to have a transmittance that increases in geometric progression (see FIG. 6) according to the distance from one end on the first input deflector 30 side of the first polarization beam splitting film 28. In order to form such film through evaporation, for example, the first plane S1 may be disposed such that the distance from the evaporation source may vary depending on the planer distance from the first input deflector 30, and may be designed in advance so as to have a desired reflection characteristic at each position based on the difference in the distance (difference in thickness of the film to be formed).

The first light guide portion 27 uses quartz (transparent medium) having a thickness, i.e., the length in the z-direction of, for example, 3 mm (see FIG. 4). The use of quartz as the first light guide portion 27 offers advantages that it provides thermal resistance against heat applied when evaporating the first polarization beam splitting film 28 and its hardness prevents warping under stress applied to the film.

An AR film 32 is formed on the second plane S2 of the first light guide portion 27. The AR film 32 suppresses reflection of image light incident from a direction perpendicular to the film. The AR film 32 is designed to have a film stress balanced with the film stress of the first polarization beam splitting film 28, and formed accordingly. The film stress may thus be balanced to suppress distortion of the first propagation optical system 24, to thereby contribute to excellent propagation of image light.

The first spacer plate 29 may use a plate-like member formed of, for example, quartz. The first spacer plate 29 is bonded, by means of a transparent adhesive, to the first plane S1 of the first light guide portion 27 where the first polarization beam splitting film 28 has been formed. The first spacer plate 29 has a refractive index of, for example, 1.5, which is substantially equal to that of the transparent adhesive. The refractive index may be set substantially equal to that of the transparent adhesive, to thereby prevent multiple reflection of image light within the transparent adhesive. The first spacer plate 29 may have a thickness, i.e., the length in the z-direction of, for example, 1.9 mm.

The first input deflector 30 is formed of, for example, quartz. The use of quartz for forming the first input deflector 30, which is the same material as the first light guide portion 27, allows for ideal suppression of reflection at the interface between the input-side bonding plane S5 and first plane S1.

Figure 5:
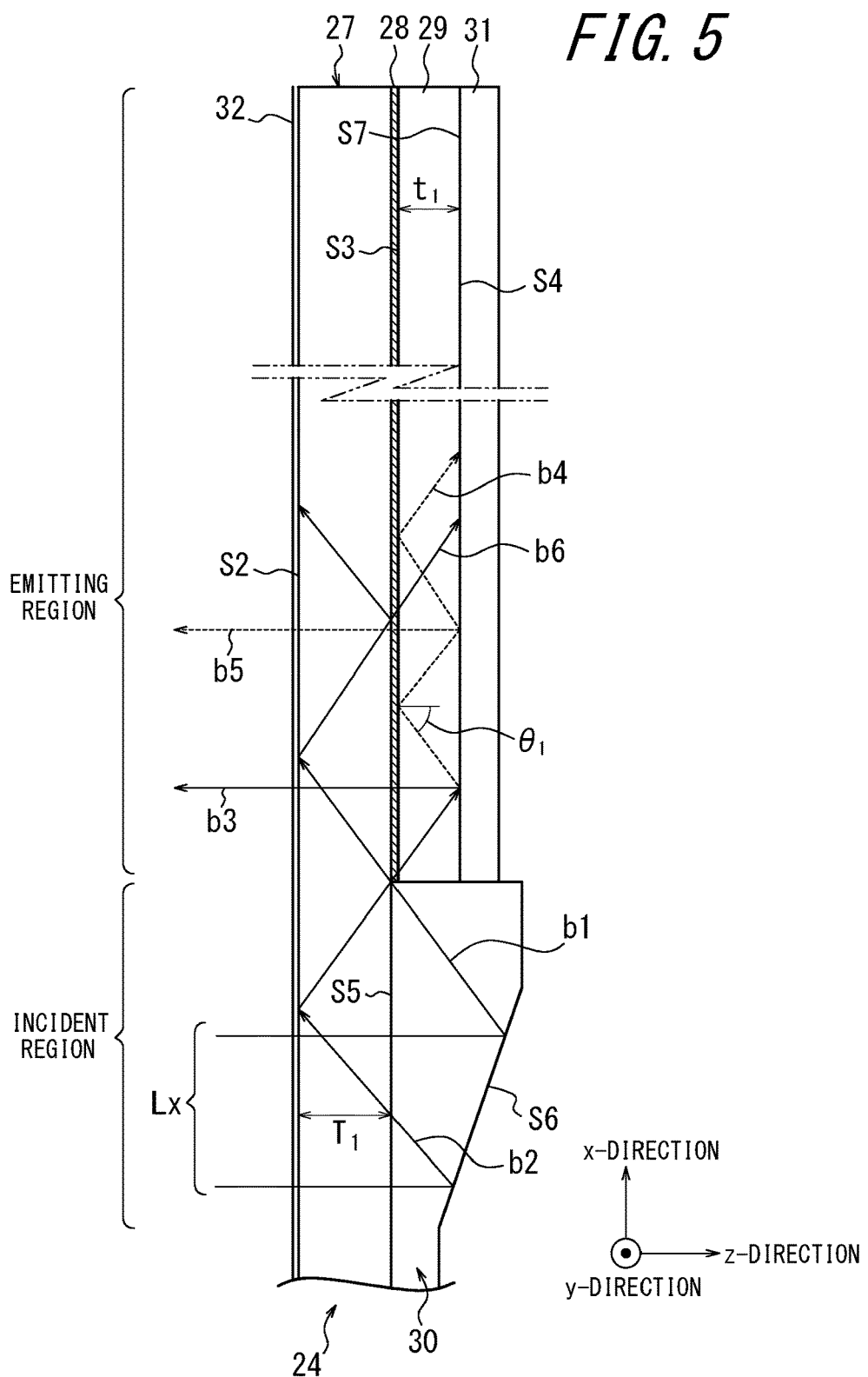
FIG. 5 is a side view of the first propagation optical system.

Aluminum is evaporated onto the slope S6 of the first input deflector 30 so as to serve as a reflective film. As illustrated in FIG. 5, the normal line of the slope S6 extends to the emission region side of the first light guide portion 27. Therefore, light fluxes perpendicularly incident on the second plane S2 of the first light guide portion 27 in the incident region are reflected at the slope S6 within the first input deflector 30 and propagated toward the emission region. The input-side bonding plane S5 and the slope S6 form a vertical angle, which will be described later. Further, an interface of the first input deflector 30 between the first spacer plate 29 and the first output deflector 31 is colored black, so as to absorb incident light fluxes without reflecting the same.

The first output deflector 31 is a reflective diffraction grating having the diffraction plane S7 contacting the first spacer plate 29. Similarly to the first polarization beam splitting film 28, the first output deflector 31 has lengths in the length direction (x-direction) and in the width direction (y-direction) of 50 mm and 20 mm, respectively. Further, the thickness, i.e., length in the z-direction, may be, for example, 2 mm or 3 mm. The diffraction plane S7 has a number of diffraction grooves extending in the y-direction perpendicular to the propagating direction of image light. The diffraction plane S7 has a grating density of, for example, 2150 [1/mm], and is designed such that image light incident on the diffraction plane S7 according to the wavelength λ in vacuum of image light has first-order diffraction light that is substantially perpendicular to the diffraction plane S7. Further, the diffraction grooves of the diffraction plane S7 are shaped and arranged such that the diffraction efficiency of the first-order diffraction light becomes maximum. Alternatively, in place of the first output deflector 31, a diffraction plane may directly be formed on the fourth plane S4 of the first spacer plate 29 so as to serve as the first output deflector.

The input-side bonding plane S5 and the slope S6 of the first input deflector 30 form a vertical angle, which is determined based on the critical angle of the first light guide portion 27 at the second plane S2, as described in below.

The first propagation optical system 24 is disposed such that a light flux Lx parallel to the optical axis OX of the image projection optical system 11 is perpendicularly incident from outside on the incident region of the second plane S2. The light flux Lx perpendicularly incident on the incident region is incident on the first input deflector 30 from the first light guide portion 27 and obliquely reflected by the slope S6. The obliquely-reflected light flux Lx transmits through the first light guide portion 27 so as to be incident on the second plane S2. The vertical angle to be formed by the input-side bonding plane S5 and the slope S6 the first input deflector 30 is determined so that the light flux Lx incident on the second plane S2 is subjected to total reflection inside the first light guide portion 27.

Therefore, the incident angle θ relative to the second plane S2 within the first light guide portion 27 needs to exceed a critical angle, that is, needs to satisfy the following: θ>critical angle=$\sin^{-1}(1/n)$ n is the refractive index of the first light guide portion 27). In Embodiment 1, the first light guide portion 27 is formed of quartz, and thus has a critical angle of 43.6°.

As to the light flux at the object height perpendicularly incident from the image projection optical system 11, the incident angle θ to the second plane S2 within the first light guide portion 27 is a double angle of the inclination angle of the slope S6 relative to the input-side bonding plane S5 of the first input deflector 30, and thus the inclination angle needs to be at least 21.8°. In Embodiment 1, the inclination angle is, for example, 25.8°, which is equal to or larger than 21.8°.

Here, the angle of a light beam incident on the incident region of the second plane S2 may be controlled, based on the size of the transmission chart 15 and the focal length of the projection optical system 16. For example, the angle of the incident light beam may be controlled to be ±4.6° in the x-direction and ±5.7° in the y-direction on the air side, and in the medium of the first light guide portion 27 formed of quartz, the angle may be controlled to fall within a range of ±3.1° in the x-direction and 3.9° in the y-direction. With the angle being controlled as above, in the aforementioned first propagation optical system 24, the light fluxes at angles of image light associated with all the object heights may be subjected to total reflection at the second plane S2 within the first light guide portion 27.

In the first propagation optical system 24 configured and disposed as above, the light flux Lx perpendicularly incident on the incident region of the second plane S2 is reflected by the slope S6 of the first input deflector 30, and obliquely incident on the emission region of the second plane S2 within the first light guide portion 27. The obliquely-incident light flux Lx is incident on the second plane S2 at an angle exceeding the critical angle and subjected to total reflection. The total-reflected light flux Lx is obliquely incident on the first polarization beam splitting film 28, transmitted by an amount of light at a predetermined ratio while the remaining amount of light is reflected. The light flux Lx reflected by first polarization beam splitting film 28 is re-incident on the second plane S2 at an angle exceeding the critical angle, and subjected to total reflection. Thereafter, the light flux Lx is repeatedly subjected to the partial reflection by the first polarization beam splitting film 28 and the total reflection by the second plane S2, so as to be propagated in the x-direction of the first light guide portion 27. Here, the light flux Lx is transmitted at a predetermined rate every time the light flux Lx is incident on the first polarization beam splitting film 28, and emitted to the first spacer plate 29.

The light flux Lx incident from the third plane S3 of the first spacer plate 29 is diffracted by the diffraction plane S7 of the first output deflector 31 bonded to the fourth plane S4, and polarized in a direction perpendicular to diffraction plane S7. The light flux Lx polarized in a direction perpendicular to the diffraction plane S7 transmits through the first spacer plate 29 to be perpendicularly incident on the first polarization beam splitting film 28 so as to transmit therethrough at the transmittance of substantially 100%, and then perpendicularly incident on the second plane S2 to be emitted to the outside from the second plane S2.

The half-wave plate 25 (see FIG. 3) is formed in a shape substantially in the same size as the emission region of the second plane S2. The half-wave plate 25 is disposed at a position opposing to the emission region of the second plane S2, by providing a gap therebetween. Accordingly, a light flux obliquely incident on the second plane S2 within the first light guide portion 27 at an angle larger than the critical angle is guaranteed to be subjected to total reflection without transmitting the second plane S2. As described above, the half-wave plate 25 rotates, by 90°, the polarization plane of a light flux emitted from the first propagation optical system 24.

Figure 7:
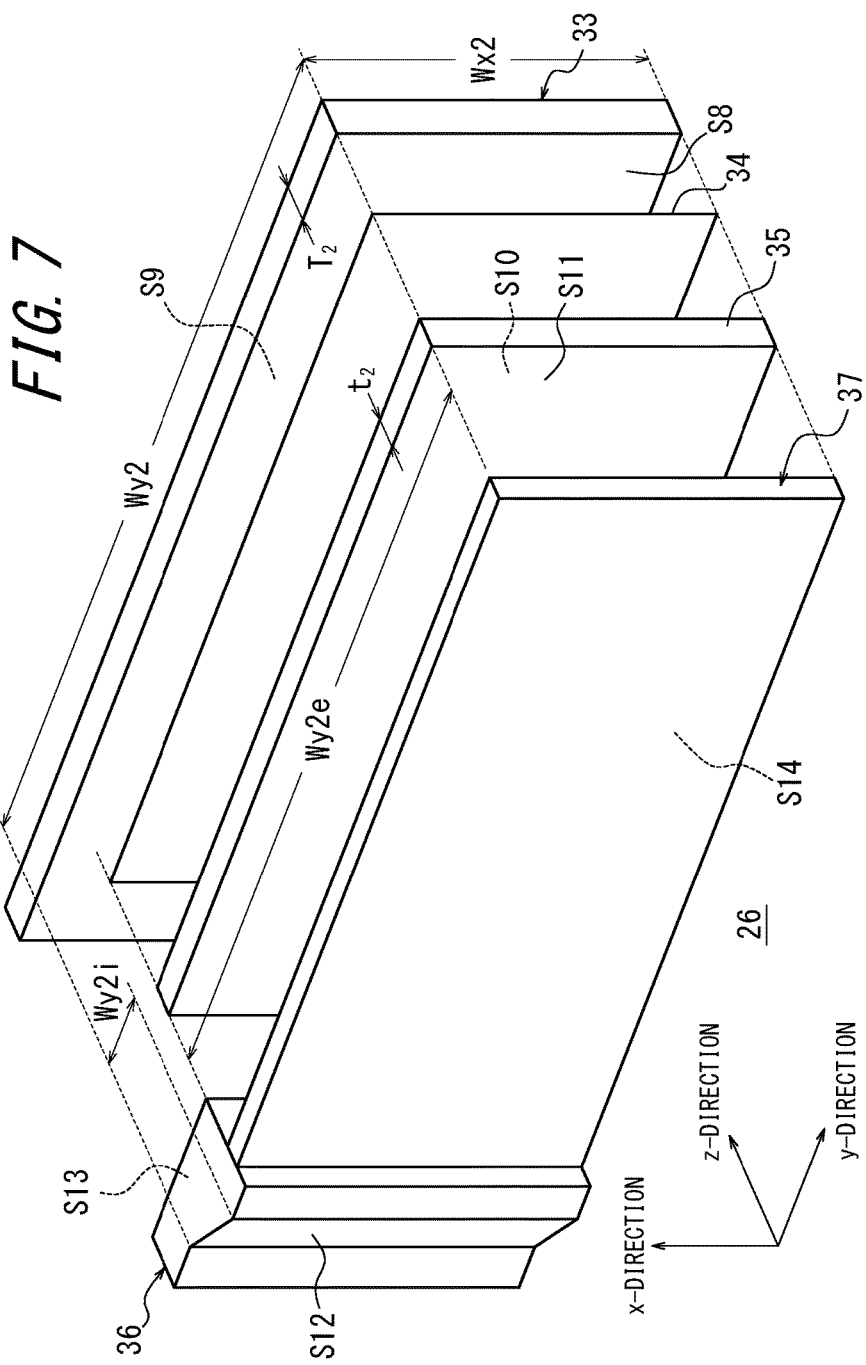
FIG. 7 is a perspective view showing the respective components of the second propagation optical system of FIG. 3.

The second propagation optical system 26 is similar in configuration to the first propagation optical system 24, except the size and the arrangement. As illustrated in FIG. 7, the second propagation optical system 26 is configured by including: a second light guide portion 33; a second polarization beam splitting film 34; a second spacer plate 35; a second input deflector 36; and a second output deflector 37. Similarly to the first propagation optical system 24, these components are integrally formed like a flat plate, and has lengths Wx2, Wy2 in the width direction ("x-direction" of FIG. 7) and in the length direction ("y-direction" of FIG. 7) of the second propagation optical system 26 or the second light guide portion 33, which are, for example, 50 mm and 110 mm, respectively. Further, the second polarization beam splitting film 34, the second spacer plate 35, and the second output deflector 37 in the second propagation optical system 26 have a length Wy2e of, for example 100 mm in the longitudinal direction. Further, the second input deflector 36 has a length Wy2i of, for example, 10 mm in the longitudinal direction. The second light guide portion 33, the second polarization beam splitting film 34, the second spacer plate 35, the second input deflector 36, and the second output deflector 37 are similar in function to the first light guide portion 27, the first polarization beam splitting film 28, the first spacer plate 29, the first input deflector 30, and the first output deflector 31, respectively.

The second light guide portion 33 has a fifth plane S8 on which the second polarization beam splitting film 34 is evaporated and a sixth plane S9 opposing to the fifth plane S8. In the second propagation optical system 26, the emission region of the second plane S2 of the first propagation optical system 24 and the incident region of the sixth plane S9 of the second propagation optical system 26 are opposing to each other, and the second propagation optical system 26 is disposed as being rotated by 90° about a straight line parallel to the first propagation optical system 24 in the z-direction (see FIG. 3). Accordingly, image light emitted from the first propagation optical system 24 is expanded in the y-direction and emitted by the second propagation optical system 26.

Next, description is given of how the first propagation optical system 24 configured to include the first spacer plate 29 reduces image degradation resulting from zero order diffraction light generated on the diffraction plane S7 of the first output deflector 31.

Referring to FIG. 5, light beams of the effective light flux Lx incident on the second plane S2 of the first light guide portion 27 and propagate inside the first light guide portion 27 include a first light beam b1 which is closest to the first output deflector 31 and a second light beam b2 which is closest to the first input deflector 30, along the x-direction. Though the second light beam b2 is explained in below, the same applies to the first light beam b1 and other light beams in the light flux Lx.

The second light beam b2, which has been incident on the first light guide portion 27 from the second plane S2, is reflected by the slope S6 of the first input deflector 20 to be incident on the first light guide portion 27 so as to propagate inside the first light guide portion 27. For example, when the second light beam b2 having been reflected once by the second plane S2 of the first light guide portion 27 is transmitted in part through the first polarization beam splitting film 28 evaporated on the first plane S1 to be incident on the first spacer plate 29 from the third plane S3, part of the second light beam b2 proceeds through the first spacer plate 29 to the fourth plane S4, so as to be incident on the diffraction plane S7 of the first output deflector 31 bonded to the fourth plane S4. Most of the incident second light beam b2 is emitted as a third light beam b3 which is first order diffraction light, in a direction perpendicular to the diffraction plane S7. The third light beam b3 transmits through the first spacer plate 29 and the first light guide portion 27, to be emitted from the second plane S2.

However, on the diffraction plane S7, part of the second light beam b2 is transformed into a fourth light beam b4 as zero order diffraction light, so as to be incident on the third plane S3 at the incident angle $\theta_1$ which is the same as the incident angle $\theta_1$ to the fourth plane S4 of the first spacer plate 29, as being inclined at the same reflection angle $\theta_1$. The first polarization beam splitting film 28 disposed between the first spacer plate 29 and the first light guide portion 27 has a property of reflecting most part of image light having a wavelength λ incident at the incident angle $\theta_1$, and the fourth light beam b4 as zero order diffraction light is specularly reflected to propagate again inside the second spacer plate 35 to be incident on the fourth plane S4.

Part of the fourth light beam b4 emitted from the fourth plane S4 is subjected to first order diffraction at the diffraction plane S7 of the first output deflector 31, and emitted as a fifth light beam b5 in a direction perpendicular to the diffraction plane S7. The fifth light beam b5 transmits through the first spacer plate 29 and the first light guide portion 27 to be emitted from the second plane S2. The rest of the fourth light beam b4 propagates again through the first spacer plate 29 in the direction of specular reflection.

In this manner, zero order diffraction light is generated, which causes the third light beam b3 and the fifth light beam b5 which are based on the second light beam b2 and parallel to each other to be emitted to an eyeball direction of the observer. The third light beam b3 and the fifth light beam b5 are condensed on the same point on the retina of an eyeball of the observer to cause interference. Such interference forms light and dark stripes (interference fringe) on the retina in the eyeball and affects image quality for observation.

Here, the optical path difference is obtained as $2t_1/\cos\theta_1$ when the light is reflected once in the first spacer plate 29, where $t_1$ represents the thickness of the first spacer plate 29. Thus, the interference fringe pitch $\Delta\theta_1$ satisfies the following equation:

[Expression 7]

$$\lambda' = \frac{\lambda}{n_{s1}} = 2t_1(1/\cos(\theta_1 + \Delta\theta_1) - 1/\cos\theta_1), \quad (1)$$

where $n_{s1}$ represents the refractive index of the first spacer plate 29 and $\lambda'$ represents the wavelength of image light in the first spacer plate 29.

Here, $\Delta\theta_1$ is minute and may be approximated as $\sin(\Delta\theta_1)=\Delta\theta_1$, $\cos(\Delta\theta_1)=1$ to be obtained as follows:

[Expression 8]

$$\Delta\theta_1 = \frac{1}{\tan\theta_1}\left(1 - \frac{2t_1 n_1}{\lambda\cos\theta_1 + 2t_1 n_1}\right) \quad (2)$$

Figure 8:
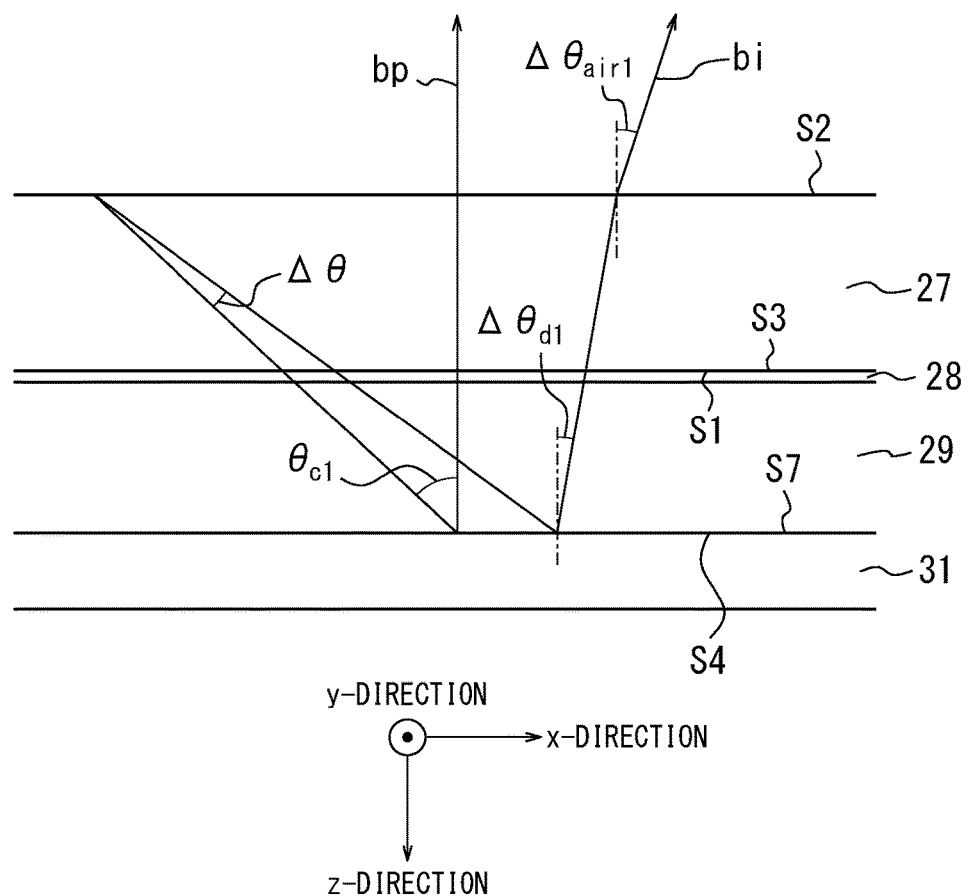
FIG. 8 is a diagram for illustrating how the image light is diffracted by the first propagation optical system.

Next, the light and dark pitch of the interference fringe to be observed by the observer of the image display device 10 is described with reference to FIG. 8. In FIG. 8, the light beam $b_p$ represents a light beam diffracted by the diffraction plane S7 of the first output deflector 31 and reflected perpendicularly by the diffraction plane S7. $\theta_{c1}$ represents the propagation angle at this time in the first spacer plate 29. The light beam $b_i$ is a light beam different from the light beam $b_p$ in the first spacer plate 29 in propagation angle in the xz plane direction by the light and dark pitch $\Delta\theta_1$ of the interference fringe.

The difference $\Delta\theta_1$ in propagation angle between the light beam $b_p$ and the light beam b before being incident on the diffraction plane S7 is converted through diffraction into the $\Delta\theta_{d1}$ below. Here, $\Delta\theta_1$ and $\Delta\theta_{d1}$ are minute, and can be approximated as $\sin(\Delta\theta)=\Delta\theta$, $\cos(\Delta\theta)=1$, $\sin(\Delta\theta_{d1})=\Delta\theta$, $\cos(\Delta\theta_{d1})=1$.

[Expression 9]

$$\Delta\theta_{d1} \cong \Delta\theta_1 \cos\theta_{c1} \quad (3)$$

Further, the light beam $b_i$ is refracted when emitted from the first light guide portion 27, so as to be converted into a light and dark pitch $\Delta\theta_{air1}$ of interference fringe observed from outside of the image display device 10. Here, the first light guide portion 27 has a refractive index $n_{w1}$, and $\Delta\theta_{d1}$ and $\Delta\theta_{air1}$ are minute enough to be assimilated similarly to the above, which provides the following expression:

[Expression 10]

$$\Delta\theta_{air1} \cong n_{w1}\frac{\cos\theta_{c1}}{\tan\theta_{c1}}\left(1 - \frac{2t_1 n_{s1}}{\lambda\cos\theta_{c1} + 2t_1 n_{s1}}\right) \quad (4)$$

According to Expression (4), $\Delta\theta_{air1}$ becomes smaller as $t_1$ becomes larger when $\theta_{c1}$ and $\lambda$ are fixed in value. In other words, the first spacer plate 29 with the thickness $t_1$ may be provided to reduce the interference fringe pitch $\Delta\theta_{air1}$ to be smaller compared with the case of not including the first spacer plate 29. The reduced fringe pitch $\Delta\theta_{air1}$ can improve image visibility. Therefore, the first spacer plate 29 is capable of alleviating image deterioration caused by interference fringe resulting from zero order diffraction light.

Figure 9:
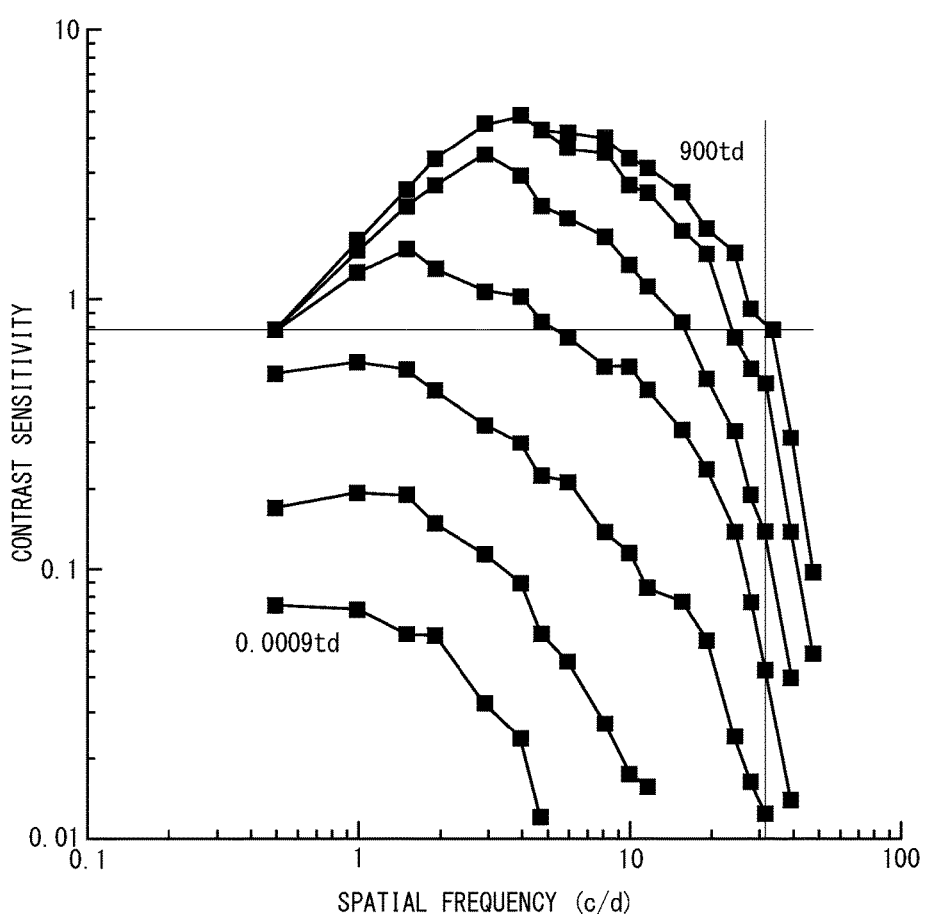
FIG. 9 is a graph illustrating a measurement example of the spatial contrast sensitivity function.

The interference fringe $\Delta\theta_{air1}$ disclosed herein appears as light and dark stripes, which can be evaluated, as to the degree of reduction in visibility, based on the spatial contrast sensitivity. The spatial contrast sensitivity function corresponds to the visual transfer function, the value of which depends on the spatial frequency and brightness of the observation target. For example, the experimental result shown in FIG. 9 have been widely known (cited from "Vision I: Structure and Initial function of Visual System" (p. 209) published by Asakura Publishing Co., Ltd.; the original text is Van Nes Fla., Bouman M A: Spatial modulation transfer in the human eye. Journal of the Optical Society of America, 57: 401-406, 1967). In the graph of FIG. 9, a plurality of lines correspond to the difference in brightness, where the values obtained under brighter environment are shown in the upper right of the graph. The lateral axis shows the cycle period of the structure per 1 degree of the angle. According to the graph, it can be appreciated that even a bright object can be seen with reduced contrast than in the low frequency region, when the spatial frequency is 30 c/d or higher. Thus, the interference fringe cycle may be increased to 30 c/d or higher to serve as a yardstick to achieve the present disclosure. The interference fringe cycle of 30 c/d corresponds to the two-point resolution of a human eye, which is 0.0006 [rad], and this spatial frequency is equal to the frequency that can be resolved by a person with a vision of 0.5.

Therefore, when Expression (4) satisfies the following conditions, the contrast of the interference fringe becomes low enough not to be visually identified with a human eye.

[Expression 11]

$$\Delta\theta_{air1} \cong n_{w1}\frac{\cos\theta_{c1}}{\tan\theta_{c1}}\left(1 - \frac{2t_1 n_{s1}}{\lambda\cos\theta_{c1} + 2t_1 n_{s1}}\right) < 0.0006 \quad (5)$$

Further, the two-point resolution 0.0003 [rad] corresponds to 60 c/d as a spatial frequency, which also corresponds the limit that can be resolved by a person with a vision of 1.0. It can also be appreciated, from the graph of FIG. 9, that the contrast sensitivity significantly drops at 60 c/d.

Therefore, the interference fringe is not visually identifiable when the fringe pitch $\Delta\theta$ is smaller than the above. That is, the following expression may further preferably be satisfied:

[Expression 12]

$$\Delta\theta_{air1} \cong n_{w1}\frac{\cos\theta_{c1}}{\tan\theta_{c1}}\left(1 - \frac{2t_1 n_{s1}}{\lambda\cos\theta_{c1} + 2t_1 n_{s1}}\right) < 0.0003 \quad (6)$$

Accordingly, the first spacer plate 29 may have the thickness $t_1$ satisfying Expression (5) and more preferably satisfying Expression (6), so that light and darkness of an image resulting from zero order diffraction light is made visually unidentifiable to a human eye.

For example, in order to satisfy Expression (5), the thickness $t_1$ of the first spacer plate 29 may be defined to be at least 0.14 mm when $\theta_{c1}$=51.6° and $\lambda$=532 nm. Further, in order to satisfy Expression (6), the thickness $t_1$ of the first spacer plate 29 may be defined to be at least 0.28 mm.

Next, referring again to FIG. 5, when the fourth light beam b4, which is part of the second light beam b2 that has transmitted through the first plane S1 is transformed into zero order diffraction light at the fourth plane S4 and reciprocated at least once between the third plane S3 and the forth plane S4 within the first spacer plate 29, and the sixth light beam b6, which is another part of the second light beam b2 that has been reflected by the first plane S1 and reciprocated once between the first plane S1 and the second plane S2 to transmit through the first plane S1 draw close to each other, interference may potentially be caused between the fourth light beam b4 and the sixth light beam b6.

In order to prevent image deterioration from being caused by such interference, the following expression may be satisfied:

[Expression 13]

$$n_{w1}\frac{\cos\theta_{c1}}{\tan\theta_{c1}}\left(1 - \frac{2T_{v1}}{\lambda\cos\theta_{c1} + 2T_{v1}}\right) < 0.0006, \quad (7)$$

where $T_1$ represents the thickness of the first light guide portion 27, which provides $T_1 = abs(n(n_{s1}t_1) - m(n_{w1}T_1))$ as to a combination of arbitrary natural numbers n and m smaller than 5. Here, abs(X) is a function representing an absolute value of X.

When the condition of Expression (7) is satisfied, image light having been reflected and propagated inside the first spacer plate 29 and image light having been reflected and propagated inside the first light guide portion 27 do not substantially overlap with each other with a reduce number of reciprocation, producing an effect of reducing image deterioration due to the influence of interference. The aforementioned condition is satisfied when, for example, $T_1 = 3$ mm, $t_1 = 1.9$ mm.

Described above is the first propagation optical system 24. Similarly to the above, the second propagation optical system 26 may also be provided with the second spacer plate 35, to thereby suppress generation of interference fringe due to zero order diffraction light of image light. When the first spacer plate 29 is not included or small in thickness, the interference fringe generated in the first propagation optical system 24 appears as light and darkness in the x-direction. In contrast, in the second propagation optical system 26, where image light propagates in the y-direction, light and darkness may potentially generate in the y-direction for the same reason as in the first propagation optical system 24. The second spacer plate 35 may be provided to narrow the interference fringe pitch, making the interference fringe less visually identifiable, which can improve image quality.

Further, for the same reason as explained as to the first propagation optical system 24, when part of image light that has transmitted through the fifth plane S8 is perpendicularly diffracted to the eighth plane S11 by the diffraction plane S14 at an angle of $\theta_{c2}$ inside the second spacer plate 35, the second spacer plate 35 has a thickness $t_2$, the second spacer plate 35 has a refractive index of $n_{s2}$, the second light guide portion 33 has a refractive index of $n_{w2}$, and image light has a wave length of $\lambda$, the following expression may be satisfied as to the light and dark pitch $\theta_{air2}$ of the interference fringe:

[Expression 14]

$$\Delta\theta_{air2} \cong n_{w2}\frac{\cos\theta_{c2}}{\tan\theta_{c2}}\left(1 - \frac{2t_2n_{s2}}{\lambda\cos\theta_{c2} + 2t_2n_{s2}}\right) < 0.0006 \quad (8)$$

Further, for the reason as explained in relation to Expression (6), when the light and darkness pitch $\Delta\theta_{air}$ of the interference fringe is smaller than the following expression, the interference fringe is not visually identifiable.

[Expression 16]

$$n_{w2}\frac{\cos\theta_{c2}}{\tan\theta_{c2}}\left(1 - \frac{2T_{v2}}{\lambda\cos\theta_{c2} + 2T_{v2}}\right) < 0.0006, \quad (10)$$

Further, similarly to the first propagation optical system 24, the following expression may preferably be satisfied:

[Expression 15]

$$\Delta\theta_{air2} \cong n_{w2}\frac{\cos\theta_{c2}}{\tan\theta_{c2}}\left(1 - \frac{2t_2n_{s2}}{\lambda\cos\theta_{c2} + 2t_2n_{s2}}\right) < 0.0003 \quad (9)$$

where $T_2$ represents the thickness of the second light guide portion 33, which provides $T_{v2} = abs(n(n_{s2}t_2) - m(n_{w2}T_2))$ as to a combination of arbitrary natural numbers n and m smaller than 5.

As explained above, according to Embodiment 1, the image display device 10 for projecting image light includes: the first spacer plate 29 disposed between the first plane S1 provided with the first polarization beam splitting film 28 and the diffraction plane S7 of the first output deflector 31a of the first propagation optical system 24, and the second spacer plate 35 disposed between the fifth plane S8 provided with the second polarization beam splitting film 34 and the diffraction plane S14 of the second output deflector 37 of the second propagation optical system 26. With this configuration, even when the interference fringe is generated due to the generation of zero order diffraction light, the light and dark pitch thereof is narrowed to be less identifiable to a human eye, to thereby reduce deterioration of an image to be observed. In particular, when Expression (6) and Expression (9) are satisfied, the light and darkness will be absolutely unidentifiable with the two-point resolution of a human eye, which can completely prevent image deterioration.

(Modified Example)

Figure 10:
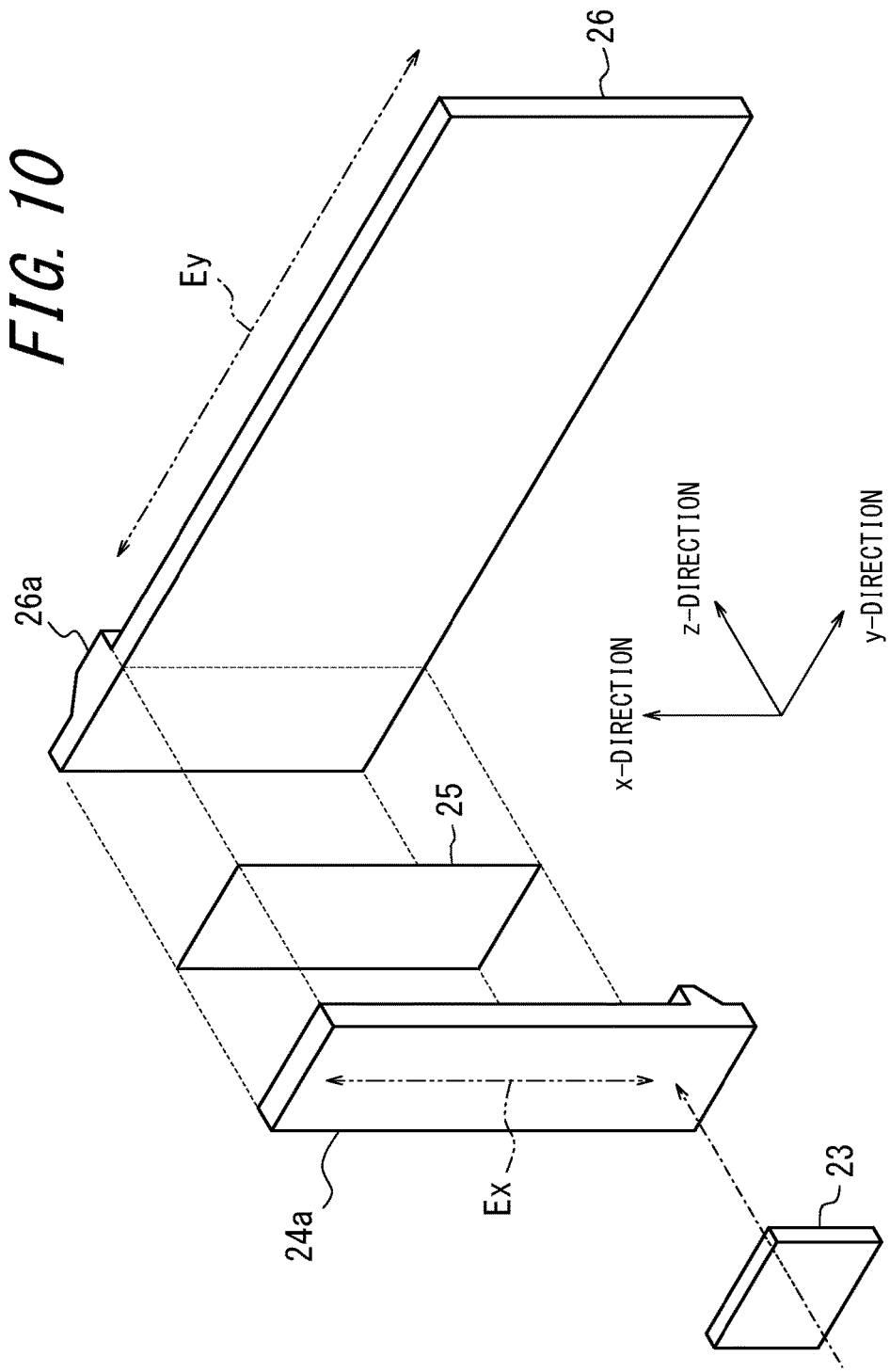
FIG. 10 is a perspective view showing the respective components spaced apart from one another of the pupil expanding optical system according to a modified example.

In Embodiment 1, the first propagation optical system 24 and the second propagation optical system 26 each use the first output deflector 31 and the second output deflector 37 each having the reflective diffraction planes S7, S14, respectively. However, in place of the first propagation optical system 24 and the second propagation optical system 26, the first propagation optical system 24a and the second propagation optical system 26a each including a transmissive diffraction plane may be arranged as shown in FIG. 10, to thereby constitute the pupil expanding optical system 12. In FIG. 10 the deflector 23 and the half-wave plate 25 both have the same functions as those of Embodiment 1. Meanwhile, the first propagation optical system 24a and the second propagation optical system 26a are different from those of Embodiment 1 in that image light is emitted from a surface opposite to the incident side.

Figure 11:
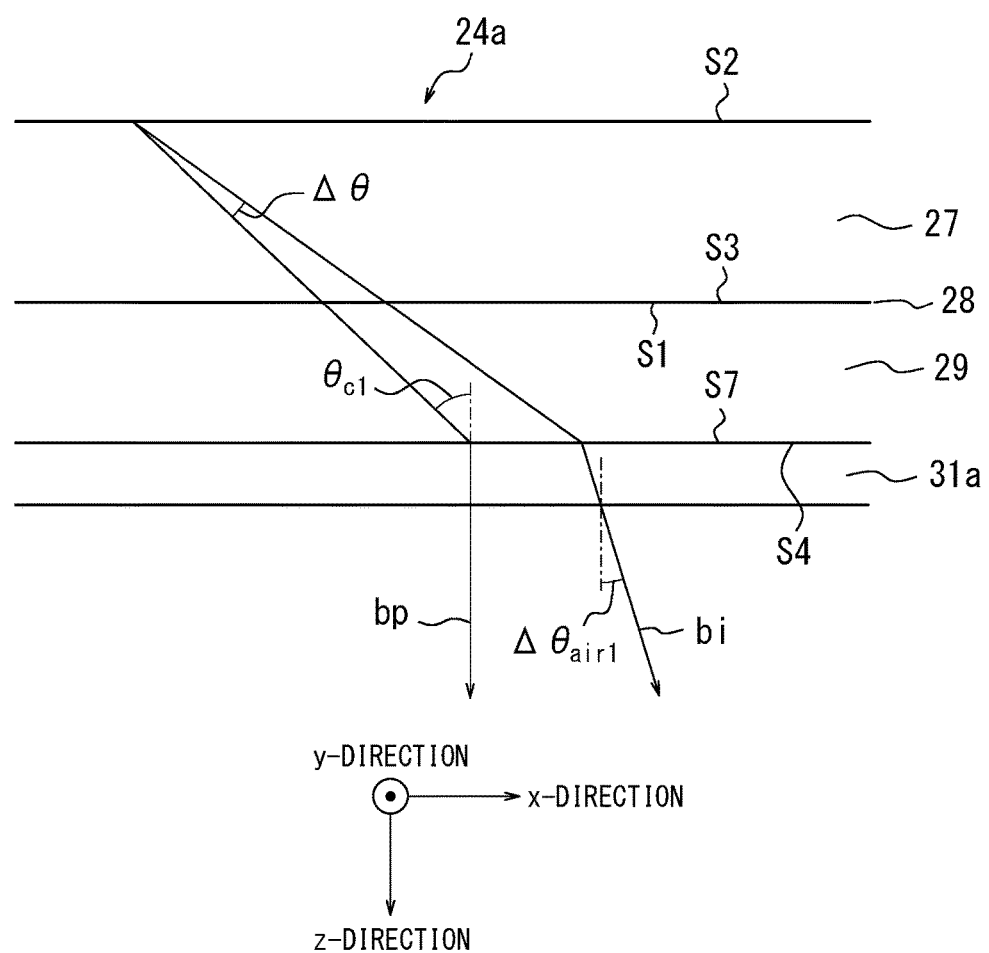
FIG. 11 is a diagram for illustrating diffraction of image light in the first propagation optical system of the modified example.

FIG. 11 is a diagram for illustrating diffraction of image light in the first propagation optical system 24a, in which the first light guide portion 27, the first polarization beam splitting film 28, the first spacer plate 29, and the first output deflector 31a for propagating image light are each illustrated in part as a partial enlarged view. Unlike the first output deflector 31 of Embodiment 1, the first output deflector 31a has the diffraction plane S7 configured as a transmissive diffraction grating. Further, the first output deflector 31a is a plate-like member formed of a material that transmits light of the wavelength of image light, with a surface opposing to the diffraction plane S7 being configured as a planar light-transmitting surface. The rest of the configuration is similar to that of the first propagation optical system 24 of Embodiment 1.

With this configuration, image light that has transmitted through the first polarization beam splitting film 28 transmits through the first spacer plate 29 to be diffracted by the diffraction plane S7 of the first output deflector 31, so as to be emitted in a direction substantially perpendicular to the diffraction plane S7. The second propagation optical system 26a is also similarly configured. As described above, an observer can observe an image from the +z-direction side (the upper right side of FIG. 10) of the second propagation optical system 26a. The modified example, which includes the first spacer plate 29 and the second spacer plate 35, also has an effect similar to that of Embodiment 1.

Further discussed below with reference to FIG. 11 is the conditions which do not allow the interference fringe to be visually identified in the case of using a transmissive diffraction grating, in a similar manner as described with reference to FIG. 8. In FIG. 11, the light beam $b_p$ shows a light beam diffracted by the diffraction plane S7 of the first output deflector 31a to perpendicularly transmit through the diffraction plane S7. The light beam $b_1$ is a light beam different from the light beam $b_p$ in propagation angle in the xz plane direction by the light and dark pitch $\Delta\theta$ of the interference fringe.

The light and dark pitch $\Delta\theta_1$ of the interference fringe was represented by Expression (2), with $\theta_1$ representing the propagation angle of image light propagating the first spacer plate 29. When the light beam $b_p$ diffracted by the diffraction plane S7 of the first output deflector 31 transmits through the diffraction plane S7 in the perpendicular direction at the angle of $\theta_{c1}$, the light beam $b_i$ that has transmitted through the first output deflector 31a to be emitted into the air is propagated at the propagation angle $\Delta\theta_{air1}$, which can be represented by the following expression. Here, the expression has been similarly assimilated as in Embodiment 1.

[Expression 17]

$$\Delta\theta_{air1} \cong n_s\Delta\theta\cos\theta_{c1} = n_s\frac{\cos\theta_{c1}}{\tan\theta_{c1}}\left(1 - \frac{2t_1 n_s}{\lambda\cos\theta_{c1} + 2t_1 n_s}\right) \quad (11)$$

Accordingly, in the case of using the transmissive first output deflector 31a, Expression (5) may be modified as follows:

[Expression 18]

$$\Delta\theta_{air1} \cong n_{s1}\frac{\cos\theta_{c1}}{\tan\theta_{c1}}\left(1 - \frac{2t_1 n_{s1}}{\lambda\cos\theta_{c1} + 2t_1 n_{s1}}\right) \le 0.0006 \quad (12)$$

which makes the contrast of the interference fringe low enough to be hardly visible.

Further, with the following expression:

[Expression 19]

$$\Delta\theta_{air1} \cong n_{s1}\frac{\cos\theta_{c1}}{\tan\theta_{c1}}\left(1 - \frac{2t_1 n_{s1}}{\lambda\cos\theta_{c1} + 2t_1 n_{s1}}\right) \le 0.0003, \quad (13)$$

visual identification of the interference fringe becomes substantially impossible for a human eye.

Further, for the same reasons, the second propagation optical system 26a may also be configured to satisfy the following expression:

[Expression 20]

$$\Delta\theta_{air2} \cong n_{w2}\frac{\cos\theta_{c2}}{\tan\theta_{c2}}\left(1 - \frac{2t_2 n_{s2}}{\lambda\cos\theta_{c2} + 2t_2 n_{s2}}\right) < 0.0006, \quad (14)$$

to thereby reduce the contrast of the interference fringe to be low enough to be hardly noticeable.

Further, the following expression may be satisfied to make the interference fringe visually unidentifiable.

[Expression 21]

$$\Delta\theta_{air2} \cong n_{w2}\frac{\cos\theta_{c2}}{\tan\theta_{c2}}\left(1 - \frac{2t_2 n_{s2}}{\lambda\cos\theta_{c2} + 2t_2 n_{s2}}\right) < 0.0003 \quad (15)$$

(Embodiment 2)

Figure 12:
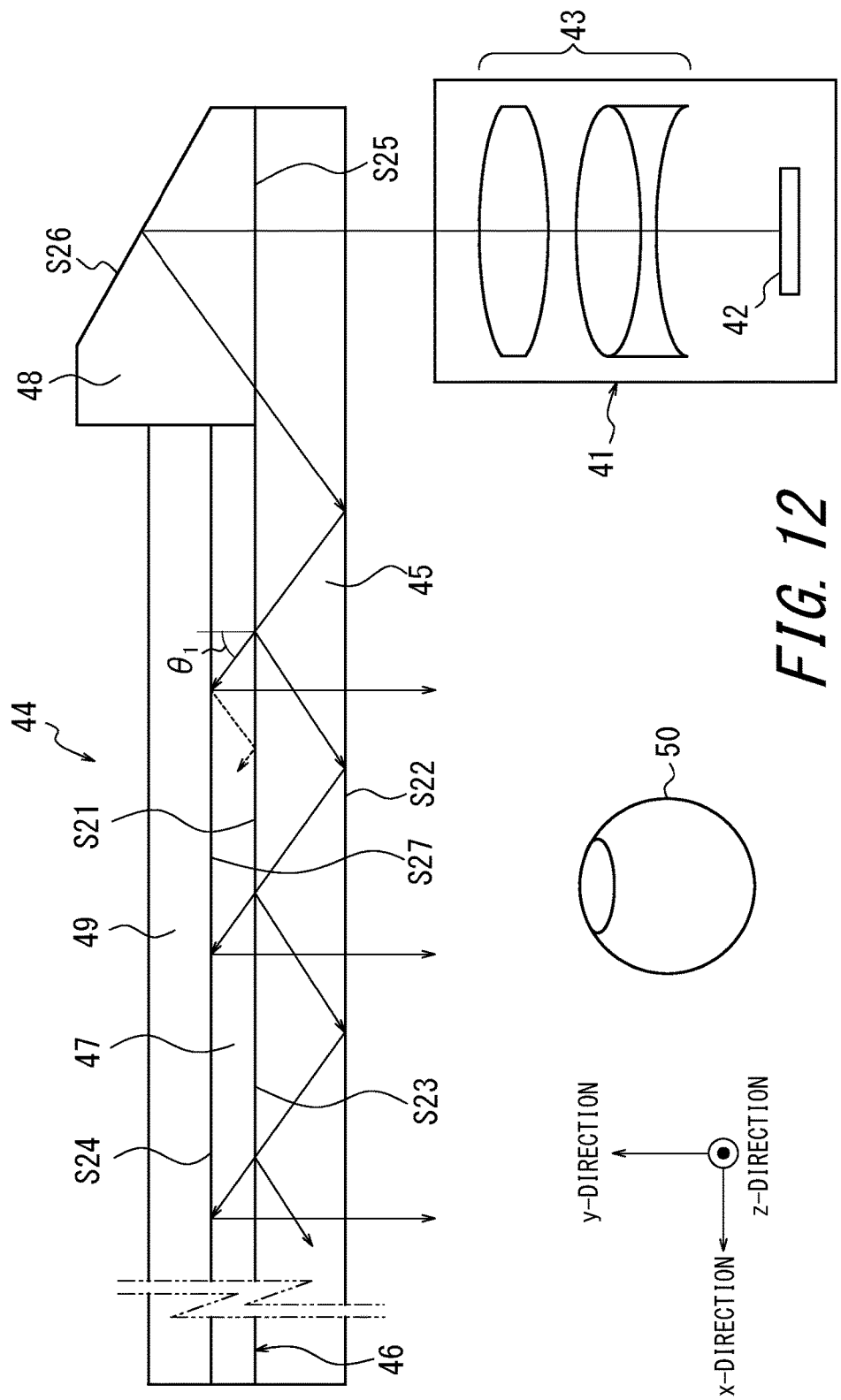
FIG. 12 is a side view schematically illustrating an optical system of the disclosed image display device according to Embodiment 2.
Figure 13:
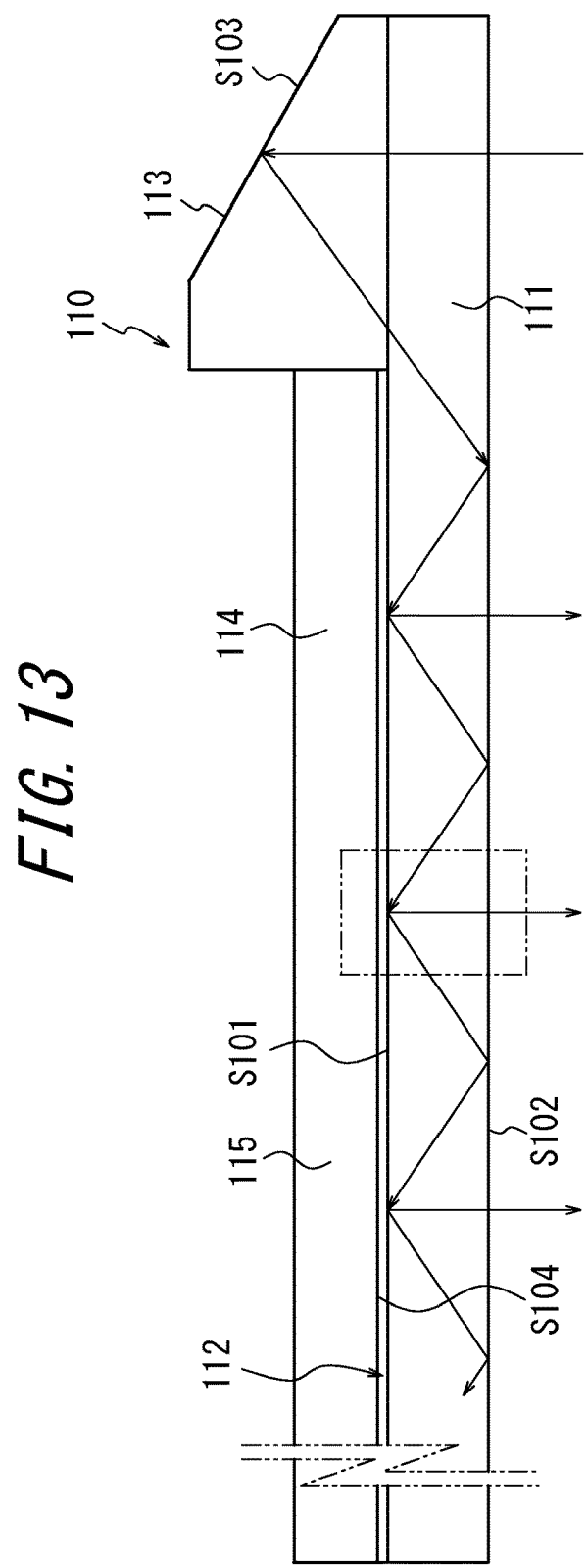
FIG. 13 is a side view for illustrating a configuration of a propagation optical system according to the conventional art.
Figure 14:
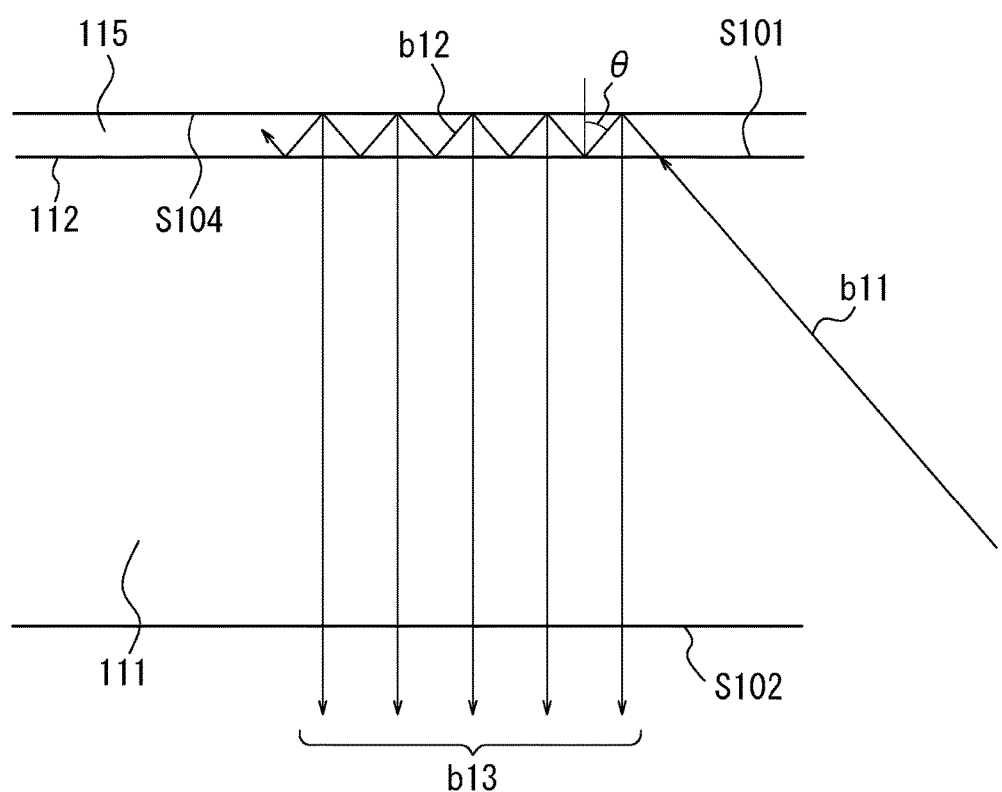
FIG. 14 is a diagram for illustrating problems involved in the propagation optical system of FIG. 13.

FIG. 12 is a side view schematically illustrating an optical system of the disclosed image display device according to Embodiment 2. Unlike Embodiment 1, the image display device according to Embodiment 2 has a propagation optical system only in the x-direction. The display device is configured, for example, to be mounted on the head so as to project an image toward an eyeball 50 of the user while guiding image light from an image projection optical system 41 in front of the eye of the user by means of a propagation optical system 44, the image projection optical system 41 being disposed on the temporal region of the head.

The image projection optical system 41 includes: a display element 42 such as an LCD and an organic EL display; and a projection optical system 43 projecting image light from the display element 42. The projection optical system 43 is disposed so as to have the exit pupil aligned with the incident plane of the propagation optical system 44 (a second plane S22 of the projection optical system 43). The propagation optical system 44 includes: a light guide portion 45; a polarization beam splitting film 46; a spacer plate 47; an input deflector 48; and an output deflector 49. These component of the propagation optical system 44 are each similarly configured as the first light guide portion 27, the first polarization beam splitting film 28, the first spacer plate 29, the first input deflector 30, and the first output deflector 31 of the first propagation optical system 24 of Embodiment 1 illustrated in FIG. 4 or 5, respectively, except differences in size and detailed shape. Further, a first plane S21, a second plane S22, a third plane S23, a fourth plane S24, an input-side bonding plane S25, a slope S26, and a diffraction plane 27 are each configured as a plane similar to the first plane S1, the second plane S2, the third plane S3, the fourth plane S4, the input-side bonding plane S5, the slope S6, and the diffraction plane S7 of Embodiment 1. These components propagates image light incident from the image projection optical system 41, similarly to the first propagation optical system 24 of Embodiment 1, and thus description of the configuration and operation of each component is omitted in Embodiment 2.

As described above, the propagation optical system 44 which propagates image light in one direction may also be used to produce an effect of expanding the pupil in the propagation direction of the image light. Further, similarly to Embodiment 1, the spacer plate 47 is disposed between the light guide portion 45 and the output deflector 49. Thus, for the same reason as in Embodiment 1, the light and darkness caused by interference resulting from zero order diffraction light becomes hardly identifiable, which can suppress deterioration of an image to be observed. Further, Expression (4) may be satisfied, so as to make the light and dark interference fringe visually unidentifiable to a human eye. Further, Expression (5) may also be preferably be satisfied, as in Embodiment 1.

Although the disclosed device has been described with reference to the drawings and Examples, various modifications and alterations thereof are readily available to a person skilled in the art based on the present disclosure. Thus, it should be noted that such modifications and alterations should all fall within the range of the disclosure.

For example, the dimension, shape, and arrangement of each component described in Embodiment 1 are illustrated as mere examples; various sizes, dimensions, shapes, and arrangements are applicable within the range of the present disclosure. Further, the image projection optical system 11 may be configured in various ways, as long as the exit pupil projecting a display image coincides with the input region of the pupil expanding optical system 12. The first output deflector 31 may be configured as a transmissive diffraction grating, rather than as a reflective diffraction grating, so as to have the projected image light emitted from a surface opposing to the diffraction plane S7 of the first output deflector 31. Further, as described above, in place of the first output deflector 31 as an independent member, a diffraction plane may directly be formed on the fourth plane S4 of the first spacer plate 29 so as to serve as the first output deflector. A configuration similar to the above may also be applied to a second propagation optical system 26 and Embodiment 2.

REFERENCE SIGNS LIST 10 image display device
11 image projection optical system
12 pupil expanding optical system
13 light source
14 illumination optical system
15 transmission chart
16 projection optical system
17 collimator lens
18 first lenticular lens
19 second lenticular lens
20 first lens
21 diffuser
22 second lens
23 deflector
24, 24a first propagating optical system
25 half-wave plate
26, 26a second propagation optical system
27 first light guide portion
28 first polarization beam splitting film
29 first spacer plate
30 first input deflector
31, 31a first output deflector
32 AR film
33 second light guide portion
34 second polarization beam splitting film
35 second spacer plate
36 second input deflector
37 second output deflector
41 image projection optical system
42 display element
43 projection optical system
44 propagation optical system
45 light guide portion
46 polarization beam splitting film
47 spacer plate
48 input deflector
49 output deflector
50 eyeball
b1 first light beam
b2 second light beam
b3 third light beam
b4 fourth light beam
b5 fifth light beam
b6 sixth light beam
Lx light flux
OX optical axis
PA projection region
S1 first plane
S2 second plane
S3 third plane
S4 fourth plane
S5 input side bonding plane
S6 slope
S7 diffraction plane
S8 fifth plane
S9 sixth plane
S10 seventh plane
S11 eighth plane
S12 slope
S13 input-side bonding plane
S14 diffraction plane
S21 first plane
S22 second plane
S23 third plane
S24 fourth plane
S25 input-side bonding plane
S26 slope
S27 diffraction plane

The invention claimed is:

1. An image display device comprising:
an image projection optical system projecting, at infinity, image light corresponding to an arbitrary image;
a first light guide portion formed like a plate having a first plane and a second plane parallel and opposing to each other, in which the image light projected from the image projection optical system is transmitted in part through the first plane with the rest being reflected between the first plane and the second plane, so as to be propagated in an x-direction perpendicular to an optical axis direction of the image projection optical system by repeating a transmission and a reflection;
a first spacer plate formed like a plate having a third plane and a fourth plane parallel and opposing to each other, the third plane being bonded to the first plane; and
a first output deflector formed on or bonded to the fourth plane, the first output deflector diffracting part of the image light transmitted through the first plane, in a direction substantially perpendicular to the first plane, the first output deflector comprising a reflective diffraction plane, and satisfying the following expression 1:

$$n_{w1} \frac{\cos\theta_{c1}}{\tan\theta_{c1}}\left(1 - \frac{2t_1 n_{s1}}{\lambda\cos\theta_{c1} + 2t_1 n_{s1}}\right) \leq 0.0006 \quad \text{[Expression 1]}$$

where $\theta_{c1}$ is a propagation angle of the image light in the first spacer plate in which the first output deflector diffracts the image light perpendicularly to the fourth plane, $t_1$ is a thickness of the first spacer plate, $\lambda$ is a wavelength of the image light, $n_{s1}$ is a refractive index of the first spacer plate, and $n_{w1}$ is a refractive index of the first light guide portion.

2. The image display device according to claim 1, satisfying the following expression 3:

$$n_{w1}\frac{\cos\theta_{c1}}{\tan\theta_{c1}}\left(1 - \frac{2T_{v1}}{\lambda\cos\theta_{c1} + 2T_{v1}}\right) < 0.0006 \quad \text{[Expression 3]}$$

where $T_1$ represents a thickness of the first light guide portion, which provides $T_{v1}=\text{abs}(n(n_{s1}t_1)-m(n_{w1}T_1))$ as to a combination of arbitrary natural numbers n and m smaller than 5.

3. The image display device according to claim 2, further comprising:
a second light guide portion formed like a plate having a fifth plane and a sixth plane parallel and opposing to each other, the second light guide portion propagating the part of the image light diffracted by the first output deflector and emitted from the second plane, the image light being transmitted in part through the fifth plane while the rest of the image light being repeatedly reflected between the fifth plane and the sixth plane, so as to be propagated in a y-direction which is perpendicular to the optical axis direction of the image projection optical system and also perpendicular to the x-direction;
a second spacer plate formed like a plate having a seventh plane and an eighth plane parallel and opposing to each other, the seventh plane being bonded to the fifth plane; and
a second output deflector formed on or bonded to the eighth plane, the second output deflector diffracting part of the image light transmitted through the fifth plane, in a direction substantially perpendicular to the fifth plane.

4. The image display device according to claim 3, wherein the second output deflector includes a reflective diffraction plane, and satisfies the following expression 4:

$$n_{w2}\frac{\cos\theta_{c2}}{\tan\theta_{c2}}\left(1 - \frac{2t_2 n_{s2}}{\lambda\cos\theta_{c2} + 2t_2 n_{s2}}\right) \leq 0.0006 \quad \text{[Expression 4]}$$

where $\theta_{c2}$ is a propagation angle of the image light in the second spacer plate in which the second output deflector diffracts the image light perpendicularly to the eighth plane, $t_2$ is a thickness of the second spacer plate, $\lambda$ is the wavelength of the image light, $n_{s2}$ is a refractive index of the second spacer plate, and $n_{w2}$ is a refractive index of the second light guide portion.

5. The image display device according to claim 3, wherein the second output deflector includes a transmissive diffraction plane, and satisfies the following expression 5:

$$n_{s2}\frac{\cos\theta_{c2}}{\tan\theta_{c2}}\left(1 - \frac{2t_2 n_{s2}}{\lambda\cos\theta_{c2} + 2t_2 n_{s2}}\right) \leq 0.0006 \quad \text{[Expression 5]}$$

where $\theta_{c2}$ is a propagation angle of the image light in the second spacer plate in which the second output deflector diffracts the image light perpendicularly to the eighth plane, $t_2$ is a thickness of the second spacer plate, $\lambda$ is the wavelength of the image light, and $n_{s2}$ is a refractive index of the second spacer plate.

6. The image display device according to claim 1, further comprising:
a second light guide portion formed like a plate having a fifth plane and a sixth plane parallel and opposing to each other, the second light guide portion propagating the part of the image light diffracted by the first output deflector and emitted from the second plane, the image light being transmitted in part through the fifth plane while the rest of the image light being repeatedly reflected between the fifth plane and the sixth plane, so as to be propagated in a y-direction which is perpendicular to the optical axis direction of the image projection optical system and also perpendicular to the x-direction;
a second spacer plate formed like a plate having a seventh plane and an eighth plane parallel and opposing to each other, the seventh plane being bonded to the fifth plane; and
a second output deflector formed on or bonded to the eighth plane, the second output deflector diffracting part of the image light transmitted through the fifth plane, in a direction substantially perpendicular to the fifth plane.

7. The image display device according to claim 6, wherein the second output deflector includes a reflective diffraction plane, and satisfies the following expression 4:

$$n_{w2}\frac{\cos\theta_{c2}}{\tan\theta_{c2}}\left(1 - \frac{2t_2 n_{s2}}{\lambda\cos\theta_{c2} + 2t_2 n_{s2}}\right) \leq 0.0006 \quad \text{[Expression 4]}$$

where $\theta_{c2}$ is a propagation angle of the image light in the second spacer plate in which the second output deflector diffracts the image light perpendicularly to the eighth plane, $t_2$ is a thickness of the second spacer plate, $\lambda$ is the wavelength of the image light, $n_{s2}$ is a refractive index of the second spacer plate, and $n_{w2}$ is a refractive index of the second light guide portion.

8. The image display device according to claim 7, satisfying the following expression 6:

$$n_{w2}\frac{\cos\theta_{c2}}{\tan\theta_{c2}}\left(1 - \frac{2T_{v2}}{\lambda\cos\theta_{c2} + 2T_{v2}}\right) < 0.0006 \quad \text{[Expression 6]}$$

where $T_2$ represents a thickness of the second light guide portion, which provides $T_{v2}=\text{abs}(n(n_{s2}t_2)-m(n_{w2}T_2))$ as to a combination of arbitrary natural numbers n and m smaller than 5.

9. The image display device according to claim 6, wherein the second output deflector includes a transmissive diffraction plane, and satisfies the following expression 5:

$$n_{s2} \frac{\cos\theta_{c2}}{\tan\theta_{c2}} \left(1 - \frac{2t_2 n_{s2}}{\lambda\cos\theta_{c2} + 2t_2 n_{s2}}\right) \leq 0.0006 \quad \text{[Expression 5]}$$

where $\theta_{c2}$ is a propagation angle of the image light in the second spacer plate in which the second output deflector diffracts the image light perpendicularly to the eighth plane, $t_2$ is a thickness of the second spacer plate, $\lambda$ is the wavelength of the image light, and $n_{s2}$ is a refractive index of the second spacer plate.

10. The image display device according to claim 9, satisfying the following expression:

$$n_{w2} \frac{\cos\theta_{c2}}{\tan\theta_{c2}} \left(1 - \frac{2T_{v2}}{\lambda\cos\theta_{c2} + 2T_{v2}}\right) < 0.0006 \quad \text{[Expression 6]}$$

where $T_2$ represents a thickness of the second light guide portion, which provides $T_{v2} = \mathrm{abs}(n(n_{s2}t_2) - m(n_{w2}T_2))$ as to a combination of arbitrary natural numbers n and m smaller than 5.

11. The image display device according to claim 1, satisfying the following expression:

$$n_{w1} \frac{\cos\theta_{c1}}{\tan\theta_{c1}} \left(1 - \frac{2t_1 n_{s1}}{\lambda\cos\theta_{c1} + 2t_1 n_{s1}}\right) < 0.0003.$$

12. An image display device comprising:
an image projection optical system projecting, at infinity, image light corresponding to an arbitrary image;
a first light guide portion formed like a plate having a first plane and a second plane parallel and opposing to each other, in which the image light projected from the image projection optical system is transmitted in part through the first plane with the rest being reflected between the first plane and the second plane, so as to be propagated in an x-direction perpendicular to an optical axis direction of the image projection optical system by repeating a transmission and a reflection;
a first spacer plate formed like a plate having a third plane and a fourth plane parallel and opposing to each other, the third plane being bonded to the first plane; and
a first output deflector formed on or bonded to the fourth plane, the first output deflector diffracting part of the image light transmitted through the first plane, in a direction substantially perpendicular to the first plane, the first output deflector comprising a transmissive diffraction plane, and satisfying the following expression 2:

$$n_{s1} \frac{\cos\theta_{c1}}{\tan\theta_{c1}} \left(1 - \frac{2t_1 n_{s1}}{\lambda\cos\theta_{c1} + 2t_1 n_{s1}}\right) \leq 0.0006 \quad \text{[Expression 2]}$$

where $\theta_{c1}$ is a propagation angle of the image light in the first spacer plate in which the first output deflector diffracts the image light perpendicularly to the fourth plane, $t_1$ is a thickness of the first spacer plate, $\lambda$ is a wavelength of the image light, and $n_{s1}$ is a refractive index of the first spacer plate.

13. The image display device according to claim 12, satisfying the following expression 3:

$$n_{w1} \frac{\cos\theta_{c1}}{\tan\theta_{c1}} \left(1 - \frac{2T_{v1}}{\lambda\cos\theta_{c1} + 2T_{v1}}\right) < 0.0006 \quad \text{[Expression 3]}$$

where $T_1$ represents a thickness of the first light guide portion, which provides $T_{v1} = \mathrm{abs}(n(n_{s1}t_1) - m(n_{w1}T_1))$ as to a combination of arbitrary natural numbers n and m smaller than 5.

14. The image display device according to claim 13, further comprising:
a second light guide portion formed like a plate having a fifth plane and a sixth plane parallel and opposing to each other, the second light guide portion propagating the part of the image light diffracted by the first output deflector and emitted from the second plane, the image light being transmitted in part through the fifth plane while the rest of the image light being repeatedly reflected between the fifth plane and the sixth plane, so as to be propagated in a y-direction which is perpendicular to the optical axis direction of the image projection optical system and also perpendicular to the x-direction;
a second spacer plate formed like a plate having a seventh plane and an eighth plane parallel and opposing to each other, the seventh plane being bonded to the fifth plane; and
a second output deflector formed on or bonded to the eighth plane, the second output deflector diffracting part of the image light transmitted through the fifth plane, in a direction substantially perpendicular to the fifth plane.

15. The image display device according to claim 14, wherein the second output deflector includes a reflective diffraction plane, and satisfies the following expression 4:

$$n_{w2} \frac{\cos\theta_{c2}}{\tan\theta_{c2}} \left(1 - \frac{2t_2 n_{s2}}{\lambda\cos\theta_{c2} + 2t_2 n_{s2}}\right) \leq 0.0006 \quad \text{[Expression 4]}$$

where $\theta_{c2}$ is a propagation angle of the image light in the second spacer plate in which the second output deflector diffracts the image light perpendicularly to the eighth plane, $t_2$ is a thickness of the second spacer plate, $\lambda$ is the wavelength of the image light, $n_{s2}$ is a refractive index of the second spacer plate, and $n_{w2}$ is a refractive index of the second light guide portion.

16. The image display device according to claim 14, wherein the second output deflector includes a transmissive diffraction plane, and satisfies the following expression 5:

$$n_{s2} \frac{\cos\theta_{c2}}{\tan\theta_{c2}} \left(1 - \frac{2t_2 n_{s2}}{\lambda\cos\theta_{c2} + 2t_2 n_{s2}}\right) \leq 0.0006 \quad \text{[Expression 5]}$$

where $\theta_{c2}$ is a propagation angle of the image light in the second spacer plate in which the second output deflector diffracts the image light perpendicularly to the eighth plane, $t_2$ is a thickness of the second spacer plate, $\lambda$ is the wavelength of the image light, and $n_{s2}$ is a refractive index of the second spacer plate.

17. The image display device according to claim 12, further comprising:
a second light guide portion formed like a plate having a fifth plane and a sixth plane parallel and opposing to each other, the second light guide portion propagating the part of the image light diffracted by the first output deflector and emitted from the second plane, the image light being transmitted in part through the fifth plane while the rest of the image light being repeatedly reflected between the fifth plane and the sixth plane, so as to be propagated in a y-direction which is perpendicular to the optical axis direction of the image projection optical system and also perpendicular to the x-direction;

a second spacer plate formed like a plate having a seventh plane and an eighth plane parallel and opposing to each other, the seventh plane being bonded to the fifth plane; and a second output deflector formed on or bonded to the eighth plane, the second output deflector diffracting part of the image light transmitted through the fifth plane, in a direction substantially perpendicular to the fifth plane.

18. The image display device according to claim 17, wherein the second output deflector includes a reflective diffraction plane, and satisfies the following expression 4:

$$n_{w2} \frac{\cos\theta_{c2}}{\tan\theta_{c2}}\left(1 - \frac{2t_2 n_{s2}}{\lambda \cos\theta_{c2} + 2t_2 n_{s2}}\right) \le 0.0006 \qquad [\text{Expression 4}]$$

where $\theta_{c2}$ is a propagation angle of the image light in the second spacer plate in which the second output deflector diffracts the image light perpendicularly to the eighth plane, $t_2$ is a thickness of the second spacer plate, $\lambda$ is the wavelength of the image light, $n_{s2}$ is a refractive index of the second spacer plate, and $n_{w2}$ is a refractive index of the second light guide portion.

19. The image display device according to claim 17, wherein the second output deflector includes a transmissive diffraction plane, and satisfies the following expression 5:

$$n_{s2} \frac{\cos\theta_{c2}}{\tan\theta_{c2}}\left(1 - \frac{2t_2 n_{s2}}{\lambda \cos\theta_{c2} + 2t_2 n_{s2}}\right) \le 0.0006 \qquad [\text{Expression 5}]$$

where $\theta_{c2}$ is a propagation angle of the image light in the second spacer plate in which the second output deflector diffracts the image light perpendicularly to the eighth plane, $t_2$ is a thickness of the second spacer plate, $\lambda$ is the wavelength of the image light, and $n_{s2}$ is a refractive index of the second spacer plate.

20. The image display device according to claim 12, satisfying the following expression:

$$n_{s1} \frac{\cos\theta_{c1}}{\tan\theta_{c1}}\left(1 - \frac{2t_1 n_{s1}}{\lambda \cos\theta_{c1} + 2t_1 n_{s1}}\right) \le 0.0003.$$

21. An image display device comprising:
an image projection optical system projecting, at infinity, image light corresponding to an arbitrary image;
a first light guide portion formed like a plate having a first plane and a second plane parallel and opposing to each other, in which the image light projected from the image projection optical system is transmitted in part through the first plane with the rest being reflected between the first plane and the second plane, so as to be propagated in an x-direction perpendicular to an optical axis direction of the image projection optical system by repeating a transmission and a reflection;
a first spacer plate formed like a plate having a third plane and a fourth plane parallel and opposing to each other, the third plane being bonded to the first plane; and
a first output deflector formed on or bonded to the fourth plane, the first output deflector diffracting part of the image light transmitted through the first plane, in a direction substantially perpendicular to the first plane, and further comprising:
a second light guide portion formed like a plate having a fifth plane and a sixth plane parallel and opposing to each other, the second light guide portion propagating the part of the image light diffracted by the first output deflector and emitted from the second plane, the image light being transmitted in part through the fifth plane while the rest of the image light being repeatedly reflected between the fifth plane and the sixth plane, so as to be propagated in a y-direction which is perpendicular to the optical axis direction of the image projection optical system and also perpendicular to the x-direction;
a second spacer plate formed like a plate having a seventh plane and an eighth plane parallel and opposing to each other, the seventh plane being bonded to the fifth plane; and
a second output deflector formed on or bonded to the eighth plane, the second output deflector diffracting part of the image light transmitted through the fifth plane, in a direction substantially perpendicular to the fifth plane,
the second output deflector including a reflective diffraction plane, and satisfying the following expression:

$$n_{w2} \frac{\cos\theta_{c2}}{\tan\theta_{c2}}\left(1 - \frac{2t_2 n_{s2}}{\lambda \cos\theta_{c2} + 2t_2 n_{s2}}\right) \le 0.0006$$

where $\theta_{c2}$ is a propagation angle of the image light in the second spacer plate in which the second output deflector diffracts the image light perpendicularly to the eighth plane, $t_2$ is a thickness of the second spacer plate, $\lambda$ is a wavelength of the image light, $n_{s2}$ is a refractive index of the second spacer plate, and $n_{w2}$ is a refractive index of the second light guide portion.

22. An image display device comprising:
an image projection optical system projecting, at infinity, image light corresponding to an arbitrary image;
a first light guide portion formed like a plate having a first plane and a second plane parallel and opposing to each other, in which the image light projected from the image projection optical system is transmitted in part through the first plane with the rest being reflected between the first plane and the second plane, so as to be propagated in an x-direction perpendicular to an optical axis direction of the image projection optical system by repeating a transmission and a reflection;
a first spacer plate formed like a plate having a third plane and a fourth plane parallel and opposing to each other, the third plane being bonded to the first plane; and
a first output deflector formed on or bonded to the fourth plane, the first output deflector diffracting part of the image light transmitted through the first plane, in a direction substantially perpendicular to the first plane, and further comprising:
- a second light guide portion formed like a plate having a fifth plane and a sixth plane parallel and opposing to each other, the second light guide portion propagating the part of the image light diffracted by the first output deflector and emitted from the second plane, the image light being transmitted in part through the fifth plane while the rest of the image light being repeatedly reflected between the fifth plane and the sixth plane, so as to be propagated in a y-direction which is perpendicular to the optical axis direction of the image projection optical system and also perpendicular to the x-direction;
- a second spacer plate formed like a plate having a seventh plane and an eighth plane parallel and opposing to each other, the seventh plane being bonded to the fifth plane; and
- a second output deflector formed on or bonded to the eighth plane, the second output deflector diffracting part of the image light transmitted through the fifth plane, in a direction substantially perpendicular to the fifth plane, the second output deflector including a transmissive diffraction plane, and satisfying the following expression:

$$n_{s2}\frac{\cos\theta_{c2}}{\tan\theta_{c2}}\left(1-\frac{2t_2 n_{s2}}{\lambda\cos\theta_{c2}+2t_2 n_{s2}}\right)\leq 0.0006$$

where $\theta_{c2}$ is a propagation angle of the image light in the second spacer plate in which the second output deflector diffracts the image light perpendicularly to the eighth plane, $t_2$ is a thickness of the second spacer plate, $\lambda$ is a wavelength of the image light, and $n_{s2}$ is a refractive index of the second spacer plate.

* * * * *